United States Patent [19]

Wang et al.

[11] Patent Number: 6,117,947
[45] Date of Patent: *Sep. 12, 2000

[54] METHOD OF MODIFYING POLY (ETHYLENE OXIDE)

[75] Inventors: James Hongxue Wang, Appleton, Wis.; David Michael Schertz, Roswell, Ga.

[73] Assignee: Kimberly-Clark Worldwide, Inc., Neenah, Wis.

[ * ] Notice: This patent is subject to a terminal disclaimer.

[21] Appl. No.: 09/002,197

[22] Filed: Dec. 31, 1997

[51] Int. Cl.$^7$ ................................................... C08L 71/02
[52] U.S. Cl. ............................................... 525/404
[58] Field of Search ............................................ 525/404

[56] References Cited

U.S. PATENT DOCUMENTS

| | | |
|---|---|---|
| Re. 30,754 | 9/1981 | Hammer et al. . |
| 3,110,695 | 11/1963 | Ceresa ...................................... 26/45.5 |
| 3,323,978 | 6/1967 | Rasmussen . |
| 3,539,666 | 11/1970 | Schirmer . |
| 3,544,655 | 12/1970 | Booth et al. . |
| 3,666,737 | 5/1972 | Lal et al. . |
| 3,676,529 | 7/1972 | Fall . |
| 3,717,541 | 2/1973 | Schirmer . |
| 3,734,876 | 5/1973 | Chu . |
| 3,763,277 | 10/1973 | Chu et al. . |
| 3,830,888 | 8/1974 | King . |
| 3,833,708 | 9/1974 | Miller et al. . |
| 3,843,589 | 10/1974 | Wartman . |
| 3,891,584 | 6/1975 | Ray-Chaudhuri et al. . |
| 3,933,943 | 1/1976 | Fahrbach et al. . |
| 3,935,141 | 1/1976 | Potts . |
| 3,953,655 | 4/1976 | Steinkamp et al. . |
| 3,954,928 | 5/1976 | Omori et al. . |
| 3,957,605 | 5/1976 | Assarsson et al. . |
| 3,963,805 | 6/1976 | Chu . |
| 3,972,961 | 8/1976 | Hammer et al. . |
| 3,993,551 | 11/1976 | Assarsson et al. . |
| 4,018,729 | 4/1977 | Faucher et al. . |
| 4,029,720 | 6/1977 | Seiler et al. . |
| 4,080,405 | 3/1978 | Agouri et al. . |
| 4,225,650 | 9/1980 | van Brederode et al. . |
| 4,528,334 | 7/1985 | Knopf et al. . |
| 4,619,988 | 10/1986 | Leung et al. . |
| 4,705,525 | 11/1987 | Abel et al. . |
| 4,725,492 | 2/1988 | Yazaki et al. . |
| 4,792,477 | 12/1988 | Ochiumi . |
| 4,810,612 | 3/1989 | Ueda et al. . |
| 4,868,222 | 9/1989 | Chau et al. . |
| 4,874,540 | 10/1989 | Greenwald et al. . |
| 4,883,699 | 11/1989 | Aniuk et al. . |
| 5,008,322 | 4/1991 | Vasta et al. ............................. 524/398 |
| 5,011,892 | 4/1991 | Engelhardt et al. . |
| 5,041,496 | 8/1991 | Engelhardt et al. . |
| 5,059,630 | 10/1991 | Fujita et al. . |
| 5,075,061 | 12/1991 | Howell . |
| 5,095,619 | 3/1992 | Davis et al. . |
| 5,209,849 | 5/1993 | Hu et al. . |
| 5,217,798 | 6/1993 | Brady et al. . |
| 5,260,371 | 11/1993 | Chen . |
| 5,300,574 | 4/1994 | Bacskai . |
| 5,342,861 | 8/1994 | Raykovitz . |
| 5,346,959 | 9/1994 | Goman . |
| 5,360,419 | 11/1994 | Chen . |
| 5,364,907 | 11/1994 | Rolando et al. . |
| 5,367,003 | 11/1994 | Petcavich . |
| 5,369,168 | 11/1994 | Famili et al. . |
| 5,385,974 | 1/1995 | Ohmae . |
| 5,391,423 | 2/1995 | Wnuk et al. . |
| 5,395,308 | 3/1995 | Fox et al. . |
| 5,412,029 | 5/1995 | Elm et al. . |
| 5,415,905 | 5/1995 | Middlesworth et al. . |
| 5,417,679 | 5/1995 | Toms et al. . |
| 5,429,874 | 7/1995 | vanPutte et al. . |
| 5,446,100 | 8/1995 | Durrance et al. . |
| 5,468,259 | 11/1995 | Sheth et al. . |
| 5,480,928 | 1/1996 | Stratta . |
| 5,489,470 | 2/1996 | Noda . |
| 5,489,647 | 2/1996 | Kussmaul . |
| 5,498,692 | 3/1996 | Noda et al. . |
| 5,498,785 | 3/1996 | Wang et al. . |
| 5,509,913 | 4/1996 | Yeo . |
| 5,532,066 | 7/1996 | Latiolais et al. . |
| 5,540,663 | 7/1996 | Kroner et al. . |
| 5,549,791 | 8/1996 | Herron et al. . |
| 5,700,872 | 12/1997 | Wang et al. . |

FOREIGN PATENT DOCUMENTS

| | | |
|---|---|---|
| 52355/93 | 3/1994 | Australia . |
| 0184440 | 6/1986 | European Pat. Off. . |
| 0 639 592 | 2/1995 | European Pat. Off. . |
| 99 911 | 9/1973 | Germany . |
| 49-126742 | 12/1974 | Japan . |
| 60-195151 | 10/1985 | Japan . |
| 61-272217 | 12/1986 | Japan . |
| 5-309111 | 11/1993 | Japan . |
| 2070046 | 9/1981 | United Kingdom . |
| 2295553 | 6/1996 | United Kingdom . |
| 94/00163 | 1/1994 | WIPO . |
| 94/00293 | 1/1994 | WIPO . |
| 95/11929 | 5/1995 | WIPO . |
| 95/20614 | 8/1995 | WIPO . |
| 95/20615 | 8/1995 | WIPO . |
| 95/20621 | 8/1995 | WIPO . |
| 95/23249 | 8/1995 | WIPO . |
| 95/23250 | 8/1995 | WIPO . |
| 96/20831 | 7/1996 | WIPO . |
| 96/21057 | 7/1996 | WIPO . |
| 96/21475 | 7/1996 | WIPO . |

OTHER PUBLICATIONS

Sperling, L.H., "Graft Copolymers," *Introduction to Physical Polymer Science*, Chapter 2, Section 2.7.2, John Wiley & Sons, New York, pp. 44–47 (1986).

(List continued on next page.)

*Primary Examiner*—Patricia A. Short
*Attorney, Agent, or Firm*—Jones & Askew LLP

[57] ABSTRACT

A method for modifying poly(ethylene oxide) by grafting polar vinyl monomers, such as poly(ethylene glycol) methacrylates and 2-hydroxyethyl methacrylate, onto the poly (ethylene oxide) is disclosed. The grafting is accomplished by mixing the poly(ethylene oxide), the monomer(s) and an initiator and applying heat. Preferably, the method is a reactive-extrusion process. The resulting modified poly (ethylene oxide) has improved melt processability and may be used to thermally process articles which have improved properties over articles similarly processed from unmodified poly(ethylene oxide).

21 Claims, 9 Drawing Sheets

OTHER PUBLICATIONS

U.S. application Serial No. 08/733,410 filed Oct. 18, 1996.
U.S. application Serial No. 08/733,551 filed Oct. 18, 1996.
U.S. application Serial No. 08/748,170 filed Nov. 12, 1996.
U.S. application Serial No. 08/755,516 filed Nov. 22, 1996.
U.S. application Serial No. 08/761,924 filed Dec. 9, 1996.
U.S. application Serial No. 08/744,730 filed Dec. 31, 1996.
U.S. application Serial No. 08/775,223 filed Dec. 31, 1996.
U.S. application Serial No. 08/777,226 filed Dec. 31, 1996, now U.S. Patent No. 5,700,872 issued Dec. 23, 1997.
U.S. application Serial No. 08/778,724 filed Dec. 31, 1996.
U.S. application Serial No. 08/778,725 filed Dec. 31, 1996.
U.S. application Serial No. 08/832,595 filed Apr. 2, 1997.
U.S. application Serial No. 08/857,411 filed May 16, 1997.
U.S. application Serial No. 08/903,864 filed Jul. 31, 1997.
U.S. application Serial No. 08/903,862 filed Jul. 31, 1997.
U.S. application Serial No. 08/903,866 filed Jul. 31, 1997.
U.S. application Serial No. 08/912,145 filed Aug. 15, 1997.
U.S. application Serial No. 08/943,755 filed Oct. 3, 1997.
U.S. application Serial No. 08/978,031 filed Nov. 25, 1997.
U.S. application Serial No. 08/978,087 filed Nov. 25, 1997.
U.S. Provisional Application Serial No. 60/070,140 filed Dec. 31, 1997.
U.S. Provisional Application Serial No. 60/070,249 filed Dec. 31, 1997.
U.S. Provisional Application Serial No. 60.070,258 filed Dec. 31, 1997.
U.S. application Serial No. 09/01,408 filed Dec. 31, 1997.
U.S. application Serial No. 09/001,525 filed Dec. 31, 1997.
U.S. application Serial No. 09/001,781 filed Dec. 31, 1997.
U.S. application Serial No. 09/001,791 filed Dec. 31, 1997.
U.S. application Serial No. 09/001,831 filed Dec. 31, 1997.
U.S. application Serial No. 09/002,059 filed Dec. 31, 1997.
U.S. application Serial No. 09/002,197 filed Dec. 31, 1997.
U.S. application Serial No. 08,862,806 filed May 27, 1997.
U.S. application Serial No. 09/084,688 filed May 26, 1998.
U.S. application Serial No. 09/088,352 filed Jun. 1, 1998.
U.S. application Serial No. 08/819,246 filed Mar. 17, 1997.
U.S. application Serial No. 09/098,398 filed Jun. 17, 1998.
U.S. application Serial No. 09/113,778 filed Jun. 10, 1998.
U.S. application Serial No. 09/131,021 filed Aug. 7, 1998.
Standard Test Method for Tensile Properties of Plastics American Society for Testing and Material (ASTM) Designation: D638–95 45–56 1995.
Tang, Tao and Baotong Huang Compatibilization of Polypropylene/Poly(Ethylene Oxide) Blends and Crystallization Behavior of the Blends *Journal of Polymer Science: Part B: Polymer Physics* 32 1991–1998 1994.
Song, Z. and W.E. Baker Melt Grafting of T–Butylaminoethyl Methacrylate Onto Polyethylene *Polymer* 33(1 3266–3273 5) 1992.
Derwent Publications, EP 0316792 (Cassella AG), 05.24.89. Abstract 1989.
Bartczak, Z. and A. Galeski Changes in Interface Shape During Crystallization in Two–Component Polymer Systems Polymer 544–548 1986.

Melt Rheology at 195°C for Modified PEO 205 Resins

Melt Rheology at 195°C for Modified PEO 12K Resins

METHOD OF MODIFYING POLY (ETHYLENE OXIDE)

FIELD OF THE INVENTION

The present invention is directed to a method of modifying poly(ethylene oxide). More particularly, the present invention is directed to methods of modifying poly(ethylene oxide) comprising grafting polar vinyl monomers, such as poly(ethylene glycol) methacrylates and 2-hydroxyethyl methacrylate, onto poly(ethylene oxide).

BACKGROUND OF THE INVENTION

Disposable personal care products such as pantiliners, diapers, tampons etc. are a great convenience. Such products provide the benefit of one time, sanitary use and are convenient because they are quick and easy to use. However, disposal of such products is a concern due to limited landfill space. Incineration of such products is not desirable because of increasing concerns about air quality and the costs and difficulty associated with separating such products from other disposed, non-incineratable articles. Consequently, there is a need for disposable products which may be quickly and conveniently disposed of without dumping or incineration.

It has been proposed to dispose of such products in municipal and private sewage systems. Ideally, such products would be flushable and degradable in conventional sewage systems. Products suited for disposal in sewage systems and that can be flushed down conventional toilets are termed "flushable". Disposal by flushing provides the additional benefit of providing a simple, convenient and sanitary means of disposal. Personal care products must have sufficient strength under the environmental conditions in which they will be used and be able to withstand the elevated temperature and humidity conditions encountered during use and storage yet still lose integrity upon contact with water in the toilet. Therefore, a water-disintegratable material having mechanical integrity when dry is desirable.

Due to its unique interaction with water and body fluids, poly(ethylene oxide) (hereinafter PEO) is currently being considered as a component material for water-disintegratable films, fibers, and flushable products. PEO,

is a commercially available water-soluble polymer that can be produced from the ring opening polymerization of the ethylene oxide,

Because of its water-soluble properties, PEO is desirable for flushable applications. However, there is a dilemma in melt processing PEO. Low molecular weight PEO resins have desirable melt viscosities and melt pressure properties for melt processing but have limited solid state properties when melt processed into structural articles such as films.

An example of a low molecular weight PEO resin is POLYOX® WSR N-80 PEO which is commercially available form Union Carbide. POLYOX® WSR N-80 PEO has an approximate molecular weight of 200,000 g/mol as determined by rheological measurements. As used herein, low molecular weight PEO compositions are defined as PEO compositions with an approximate molecular weight of less than and including about 200,000 g/mol.

In personal care product industry, flushable thin-gauged films and melt-spun fibers are desired for commercial viability and ease of disposal. The low melt strength and low melt elasticity of low molecular weight PEO limit the ability of the low molecular weight PEO to be drawn into films having a thickness of less than about 1.25 mil. Although low molecular weight PEO can be thermally processed into films, thin-gauged films of less than about 1 mil in thickness cannot be obtained due to the lack of melt strength and melt elasticity of the low molecular weight PEO. Efforts have been attempted to improve the processability of PEO by blending the PEO with a second polymer, a copolymer of ethylene and acrylic acid, in order to increase the melt strength. The PEO/ethylene acrylic acid copolymer blend is able to be processed into films of about 1.2 mils in thickness. However, the blend and resulting film are not water-soluble, especially at high levels of ethylene acrylic acid copolymer, i.e. about 30 weight percent. More importantly, thin films made from low molecular weight PEO are too weak and brittle to be useful for personal care applications. Low molecular weight PEO films have low tensile strength, low ductility, and are too brittle for commercial use. Further, films produced from low molecular weight PEOs become brittle during storage at ambient conditions. Such films shatter and are not suited for commercial applications.

High molecular weight PEO resins are expected to produce films with improved mechanical properties compared to films produced from low molecular weight PEO resins. An example of a high molecular weight PEO is POLYOX® WSR 12K PEO which is commercially available from Union Carbide. POLYOX® WSR 12K PEO has a reported approximate molecular weight of 1,000,000 g/mol as determined by rheological measurements. As used herein, high molecular weight PEOs are defined as PEOs with an approximate molecular weight of greater than and including about 300,000 g/mol.

High molecular weight PEOs have poor processability due to their high melt viscosities and poor melt drawabilities. Melt pressure and melt temperature are significantly elevated during melt extrusion of high molecular weight PEOs. During extrusion of high molecular weight PEOs, severe melt fracture is observed. Only very thick sheets can be made from high molecular weight PEOs. High molecular weight PEOs cannot be thermally processed into films of less than about 3–4 mil in thickness. High molecular weight PEOs suffer from severe melt degradation during extrusion and melt processing. This results in breakdown of the PEO molecules and formation of bubbles in the extrudate. The inherent deficiencies of high molecular weight PEOs make it impossible to utilize high molecular weight PEOs in film applications. Even the addition of high levels of plasticizer to the high molecular weight PEOs do not improve the melt processabilities sufficiently to allow the production of thin films without melt fracture and film breakage occurring. In addition, the use of plasticizer in films causes latent problems due to migration of the plasticizer to the film surface.

There is also a dilemma in utilizing PEO in the fiber-making processes. PEO resins of low molecular weights, for example 200,000 g/mol have desirable melt viscosity and melt pressure properties for extrusion processing but cannot be processed into fibers due to their low melt elasticities and low melt strengths. PEO resins of higher molecular weights, for example greater than 1,000,000 g/mol, have melt viscosities that are too high for fiber-spinning processes. These properties make conventional PEOs difficult to process into fibers using conventional fiber-making processes.

PEO melt extruded from spinning plates and fiber spinning lines resists drawing and is easily broken. PEO resins do not form thin diameter fibers using conventional melt fiber-making processes. Conventional PEO resins can only be melt processed into strands with diameters in the range of several millimeters. Therefore, PEO compositions with appropriate melt viscosities for processing fibers and with greater melt elasticities and melt strengths are desired.

In the personal care industry, flushable melt-spun fibers are desired for commercial viability and ease of disposal. PEO fibers have been produced by a solution casting process. However, it has not been possible to melt process PEO fibers using conventional fiber making techniques such as melt spinning. Melt processing techniques are more desirable than solution casting because melt processing techniques are more efficient and economical. Melt processing of fibers is needed for commercial viability. Prior art PEO compositions cannot be extruded into the melt with adequate melt strength and elasticity to allow attenuation of fibers. Presently, fibers cannot be produced from conventional PEO compositions by melting spinning.

Thus, currently available PEO resins are not practical for melt processing, thin films, fibers or personal care applications. What is needed in the art, therefore, is a means to overcome the difficulties in melt processing of currently available PEO resins.

SUMMARY OF THE INVENTION

The present invention is directed to methods for improving the processability of PEO. More particularly, the present invention relates to methods of modifying PEO to improve its melt processability by grafting polar vinyl monomers, such as poly(ethylene glycol) methacrylates or 2-hydroxyethyl methacrylate, onto the PEO. The grafting is accomplished by mixing PEO, monomer(s) and initiator and applying heat. In a preferred embodiment, the method of modification is a reactive-extrusion process. PEOs modified in accordance with this invention have improved melt processabilities and can be thermally processed into films, fibers and other articles which have improved properties over films, fibers and articles similarly processed from unmodified PEO compositions.

To overcome the disadvantages of the prior art, this invention teaches a method of grafting polar functional groups onto PEO in the melt. Modification of PEO reduces the melt viscosity, melt pressure and melt temperature. Additionally, modification of high molecular weight PEO in accordance with the invention eliminates the severe melt fracture observed when extruding unmodified high molecular weight PEO. This invention provides methods of producing improved, thermally processable PEO resins by modifying PEO. The modified PEO resins can be solidified into pellets for later thermal processing into useful shapes such as thin films and fibers which are in turn useful as components in personal care products.

As used herein, the term "graft copolymer" means a copolymer produced by the combination of two or more chains of constitutionally or configurationally different features, one of which serves as a backbone main chain, and at least one of which is bonded at some point(s) along the backbone and constitutes a side chain. As used herein, the term "grafting" means the forming of a polymer by the bonding of side chains or species at some point(s) along the backbone of a parent polymer. (See Sperling, L. H., *Introduction to Physical Polymer Science* 1986 pp. 44–47 which is incorporated by reference herein in its entirety.)

Modification of PEO resins with starting molecular weights of between about 300,000 g/mol to about 8,000,000 g/mol allows the modified PEO resins to be drawn into films with thicknesses of less than 0.5 mil. Modification of PEO resins with starting molecular weights of between about 400,000 g/mol to about 8,000,000 g/mol is preferred for film making. Films drawn from the modified PEO compositions have better softness and greater clarity than films drawn from unmodified low molecular weight PEO. Thermal processing of films from high molecular weight PEO modified in accordance with this invention also results in films with improved mechanical properties over films similarly processed from unmodified low molecular weight PEO films.

Modification of PEO resins with starting molecular weights of between about 50,000 g/mol to about 400,000 g/mol allows the modified PEO resins to be extruded into fibers using conventional melt spinning processes. Modification of PEO resins with starting molecular weights of between about 50,000 g/mol to about 200,000 g/mol is preferred for fiber making. The modification of PEO in accordance with this invention improves the melt properties of the PEO allowing the modified PEO to be melted and attenuated into fibers. Thus, the modified PEO can be processed into water-soluble fibers using both meltblown and spunbound processes which are useful for liners, cloth-like outer covers, etc. in flushable personal care products.

These and other features and advantages of the present invention will become apparent after a review of the following detailed description of the disclosed embodiments.

DETAILED DESCRIPTION

Figure 1:
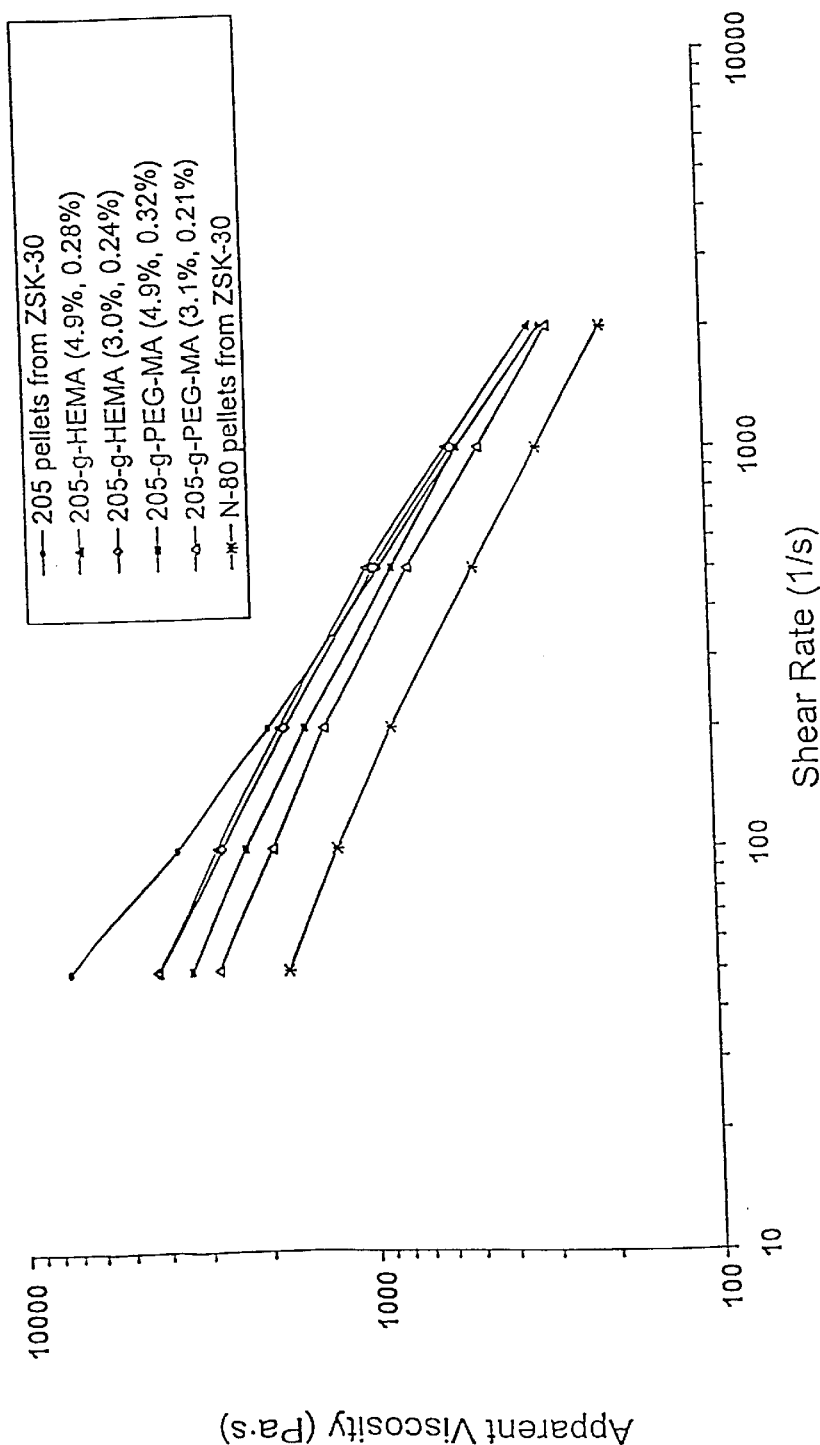
FIG. 1 compares the melt rheology curve of an unmodified PEO resin of 600,000 g/mol approximate molecular weight, Example 1, and the melt rheology curves of PEO compositions modified from the 600,000 g/mol molecular weight PEO resin, Examples 2–5.

Improved films and fibers can be melt processed using conventional methods from commercially available PEO resins when modified in accordance with this invention. The PEO resins useful for modification for film-making purposes include, but are not limited to, PEO resins having initial reported approximate molecular weights ranging from about 300,000 g/mol to about 8,000,000 g/mol as determined by rheological measurements. Such PEO resins are commercially available from, for example, Union Carbide Corporation and are sold under the trade designations POLYOX® WSR N-750 and POLYOX® UCARFLOC® Polymer 309, respectively. Modification of PEO resins with starting molecular weights from about 300,000 g/mol to about 8,000,000 g/mol are desired and modification of PEO resins with starting molecular weights from about 400,000 g/mol to about 8,000,000 are more desired. Commercially available resins within the desired ranges include, but are not limited to, POLYOX® WSR N-205 and POLYOX® WSR N-12K.

Fibers can be made using conventional processing methods from commercially available PEO resins when modified in accordance with this invention. The PEO resins useful for modification for fiber-making purposes include, but are not limited to, PEO resins having initial reported approximate molecular weights ranging from about 50,000 g/mol to about 400,000 g/mol. Higher molecular weights are desired for increased mechanical and physical properties and lower molecular weights are desired for ease of processing. Desirable PEO resins for fiber making have molecular weights ranging from 50,000 to 300,000 g/mol before modification and more desired PEO resins for fiber making have molecular weights ranging from 50,000 to 200,000 g/mol before modification. The PEO compositions modified from PEO resins within the above resins provide desirable balances between mechanical and physical properties and processing properties. Two PEO resins within the above preferred ranges are commercially available from Union Carbide Corporation and are sold under the trade designations POLYOX® WSR N-10 and POLYOX® WSR N-80. These two resins have reported approximate molecular weights, as determined by rheological measurements, of about 100,000 g/mol and 200,000 g/mol, respectively.

Other PEO resins available from, for example, Union Carbide Corporation within the above approximate molecular weight ranges are sold under the trade designations WSR N-750, WSR N-3000, WSR-3333, WSR-205, WSR-N-12K, WSR-N-60K, WSR-301, WSR Coagulant, WSR-303. (See *POLYOX®: Water Soluble Resins*, Union Carbide Chemicals & Plastic Company, Inc., 1991 which is incorporated by reference herein in its entirety.) Both PEO powder and pellets of PEO can be used in this invention since the physical form of PEO does not affect its behavior in the melt state for grafting reactions. This invention has been demonstrated by the use of PEO in powder form as supplied by Union Carbide. However, the PEO resins to be modified may be obtained from other suppliers and in other forms, such as pellets. The PEO resins and modified compositions may optionally contain various additives such as plasticizers, processing aids, rheology modifiers, antioxidants, UV light stabilizers, pigments, colorants, slip additives, antiblock agents, etc. which may be added before or after modification.

A variety of polar vinyl monomers may be useful in the practice of this invention. The term "monomer(s)" as used herein includes monomers, oligomers, polymers, mixtures of monomers, oligomers and/or polymers, and any other reactive chemical species which is capable of covalent bonding with the parent polymer, PEO. Ethylenically unsaturated monomers containing a polar functional group, such as hydroxyl, carboxyl, amino, carbonyl, halo, thiol, sulfonic, sulfonate, etc. are appropriate for this invention and are desired. Desired ethylenically unsaturated monomers include acrylates and methacrylates. Particularly desirable ethylenically unsaturated monomers containing a polar functional group are 2-hydroxyethyl methacrylate (hereinafter HEMA) and poly(ethylene glycol) methacrylates (hereinafter PEG-MA). A particularly desirable poly(ethylene glycol) methacrylate is poly(ethylene glycol) ethyl ether methacrylate. However, it is expected that a wide range of polar vinyl monomers would be capable of imparting similar effects as HEMA and PEG-MA to PEO and would be effective monomers for grafting. The amount of polar vinyl monomer relative to the amount of PEO may range from about 0.1 to about 20 weight percent of monomer to the weight of PEO. Desirably, the amount of monomer should exceed 0.1 weight percent in order to sufficiently improve the processability of the PEO. More desirably, the amount of monomer should be at the lower end of the above disclosed range in order to decrease costs. A range of grafting levels is demonstrated in the Examples. Typically, the monomer addition levels were between 2.5 percent and 15 percent of the weight of the base PEO resin.

This invention has been demonstrated in the following Examples by the use of PEG-MA and HEMA as the polar vinyl monomers. Both the PEG-MA and HEMA were supplied by Aldrich Chemical Company. The HEMA used in the Examples was designated Aldrich Catalog number 12,863–5 and the PEG-MA was designated Aldrich Catalog number 40,954–5. The PEG-MA was a poly(ethylene glycol) ethyl ether methacrylate having a number average molecular weight of approximately 246 grams per mol. PEG-MA with a number average molecular weight higher or lower than 246 g/mol are also applicable for this invention. The molecular weight of the PEG-MA can range up to 50,000 g/mol. However, lower molecular weights are preferred for faster grafting reaction rates. The desired range of the molecular weight of the monomers is from about 246 to about 5,000 g/mol and the most desired range is from about 246 to about 2,000 g/mol. Again, it is expected that a wide range of polar vinyl monomers as well as a wide range of molecular weights of monomers would be capable of imparting similar effects to PEO resins and would be effective monomers for grafting and modification purposes.

A variety of initiators may be useful in the practice of this invention. When grafting is achieved by the application of heat, as in a reactive-extrusion process, it is desirable that the initiator generates free radicals through the application of heat. Such initiators are generally referred to as thermal initiators. For the initiator to function as a useful source of radicals for grafting, the initiator should be commercially and readily available, stable at ambient or refrigerated conditions, and generate radicals at reactive-extrusion temperatures.

Compounds containing an O—O, S—S, or N=N bond may be used as thermal initiators. Compounds containing O—O bonds, peroxides, are commonly used as initiators for polymerization. Such commonly used peroxide initiators include: alkyl, dialkyl, diaryl and arylalkyl peroxides such as cumyl peroxide, t-butyl peroxide, di-t-butyl peroxide, dicumyl peroxide, cumyl butyl peroxide, 1,1-di-t-butyl peroxy-3,5,5-trimethylcyclohexane, 2,5-dimethyl-2,5-di(t-butylperoxy)hexane, 2,5-dimethyl-2,5-bis(t-butylperoxy) hexyne-3 and bis(a-t-butyl peroxyisopropylbenzene); acyl peroxides such as acetyl peroxides and benzoyl peroxides; hydroperoxides such as cumyl hydroperoxide, t-butyl hydroperoxide, p-methane hydroperoxide, pinane hydroperoxide and cumene hydroperoxide; peresters or peroxyesters such as t-butyl peroxypivalate, t-butyl peroctoate, t-butyl perbenzoate, 2,5-dimethylhexyl-2,5-di(perbenzoate) and t-butyl di(perphthalate); alkylsulfonyl peroxides; dialkyl peroxymonocarbonates; dialkyl peroxydicarbonates; diperoxyketals; ketone peroxides such as cyclohexanone peroxide and methyl ethyl ketone peroxide. Additionally, azo compounds such as 2,2'-azobisisobutyronitrile abbreviated as AIBN, 2,2'-azobis(2,4-dimethylpentanenitrile) and 1,1'-azobis(cyclohexanecarbonitrile) may be used as the initiator. This invention has been demonstrated in the following Examples by the use of a liquid, organic peroxide initiator available from Elf Atochem North America, Inc. of Philadelphia, Pa., sold under the trade designation LUPERSOL® 101. LUPERSOL® 101 is a free radical initiator and comprises 2,5-dimethyl-2,5-di(t-butylperoxy) hexane. Other initiators and other grades of LUPERSOL® initiators may also be used, such as LUPERSOL® 130.

A variety of reaction vessels may be useful in the practice of this invention. The modification of the PEO can be performed in any vessel as long as the necessary mixing of PEO, the monomer and the initiator is achieved and enough thermal energy is provided to effect grafting. Desirably, such vessels include any suitable mixing device, such as Bradender Plasticorders, Haake extruders, single or multiple screw extruders, or any other mechanical mixing devices which can be used to mix, compound, process or fabricate polymers. In a desired embodiment, the reaction device is a counter-rotating twin-screw extruder, such as a Haake extruder available from Haake, 53 West Century Road, Paramus, N.J. 07652 or a co-rotating, twin-screw extruder, such as a ZSK-30 twin-screw, compounding extruder manufactured by Werner & Pfleiderer Corporation of Ramsey, New Jersey. It should be noted that a variety of extruders can be used to modify the PEO in accordance with the invention provided that mixing and heating occur.

The ZSK-30 extruder allows multiple feeding, has venting ports and is capable of producing modified PEO at a rate of up to 50 pounds per hour. If a higher rate of production of modified PEO is desired, a commercial-scale ZSK-58 extruder manufactured by Werner & Pfleiderer may be used. The ZSK-30 extruder has a pair of co-rotating screws arranged in parallel with the center to center distance between the shafts of the two screws at 26.2 mm. The nominal screw diameters are 30 mm. The actual outer diameters of the screws are 30 mm and the inner screw diameters are 21.3 mm. The thread depths is 4.7 mm. The lengths of the screws are 1328 mm and the total processing section length was 1338 mm.

This ZSK-30 extruder had 14 processing barrels, which are numbered consecutively 1 to 14 from the feed barrel to the die for the purposes of this disclosure. The first barrel, barrel #1, received the PEO and was not heated but cooled by water. The other thirteen barrels were heated. The monomer, HEMA or PEG-MA, was injected into barrel #5 and the initiator was injected into barrel #6. Both the monomer and the initiator were injected via a pressurized nozzle injector, also manufactured by Werner & Pfleiderer. The order in which the PEO, monomer and initiator are added is not critical and the initiator and monomer may be added at the same time or in reverse order. However, the order used in the following Examples is desired. The die used to extrude the modified PEO strands has four openings of 3 mm in diameter which are separated by 7 mm. The modified PEO strands were extruded onto an air-cooling belt and then pelletized. The extruded PEO melt strands were cooled by air on a fan-cooled conveyor belt 20 feet in length.

Another extruder suitable as the reaction device includes a Haake extruder. The modified PEO compositions of Examples 31, 32 and 33 suitable for fiber-making purposes were modified by a reactive extrusion process using a Haake extruder. The Haake extruder that was used was a counter-rotating, twin-screw extruder that contained a pair of custom-made, counter rotating conical screws. The Haake extruder had a length of 300 millimeters. Each conical screw had a diameter of 30 millimeters at the feed port and a diameter of 20 millimeters at the die. The monomer and the initiator were added at the feed throat of the Haake extruder contemporaneously with the PEO resin.

The Haake extruder comprised six sections as follows: Section 1 comprised a double-flighted forward pumping section having a large screw pitch and high helix angle. Section 2 comprised a double-flighted forward pumping section having a smaller screw pitch than Section 1. Section 3 comprised a double-flighted forward pumping section having a smaller screw pitch than Section 2. Section 4 comprised a double-flighted and notched reverse pumping section where one complete flight was notched. Section 5 comprised a double-flighted and notched forward pumping section containing two complete flights. And, Section 6 comprised a double-flighted forward pumping section having a screw pitch intermediate that of Section 1 and Section 2.

EXAMPLES

PEO Compositions Suitable for Film Making

Examples 1–21 have been demonstrated by the use of the ZSK-30 extruder as detailed above. For the following Examples, the extruder barrel temperatures were set at 180° C. for all of the seven zones of the extruder. The screw speed was set at 300 rpm. The PEO resin was fed into the extruder with a K-Tron gravimetric feeder at a throughput of 20 pounds per hour. The selected monomer and the initiator were fed by Eldex pumps into the extruder at the various rates reported in Table 1. The extrusion conditions, actual barrel temperatures for the seven zones of the extruder, polymer melt temperature, melt pressure, and percent torque, were monitored during the reactive-extrusion for each of the twenty Examples and are reported in Table 2. The modified PEO strands were cooled by air on a fan-cooled conveyor belt 20 feet in length. The solidified strands were then pelletized in a Conair pelletizer available from Conair of Bay City, Mich.

The weight percentages of the components used in the Examples were calculated relative to the weight of the base resin, PEO, unless otherwise indicated. In the following Examples, five different approximate molecular weight PEO resins were used and tested: POLYOX® WSR 205 PEO having a reported initial approximate molecular weight of 600,000 g/mol was used in Examples 1–5, 11–13 and 20; POLYOX® WSR 12K PEO having a reported initial approximate molecular weight of 1,000,000 g/mol was used in Examples 6–10; POLYOX® WSR N-750 PEO having a reported initial approximate molecular weight of 300,000 g/mol was used in Examples 14–16; POLYOX® WSR N-3000 PEO having a reported initial approximate molecular weight of 400,000 g/mol was used in Examples 17–19; and POLYOX® WSR N-80 PEO having a reported initial approximate molecular weight of 200,000 g/mol was used in Example 21.

Additionally, two monomers, HEMA and PEG-MA, and several levels of monomer addition, ranging from as low as 0.80 weight percent to as high as 5.00 weight percent of monomer to weight of PEO resin, were used and tested in the Examples. The relative amount of initiator used in the Examples varied from 0.12 to 0.32 weight percent of initiator to weight of PEO resin. The trade designation of the PEO, the monomer, and the amounts of PEO, monomer and initiator used in the Examples are listed in Table 1. Examples 1 represents a control sample of unmodified PEO of initial approximate molecular weight of 600,000 g/mol. Example 6 represents a control sample of unmodified PEO of initial approximate molecular weight of 1,000,000 g/mol. Example 14 represents a control sample of unmodified PEO of initial approximate molecular weight of 300,000 g/mol. Example 17 represents a control sample of unmodified PEO of initial approximate molecular weight of 400,000 g/mol. Example 20 represents a comparative example of PEO of initial approximate molecular weight of 600,000 g/mol modified only by the addition of initiator without monomer. And, Example 21 represents a comparative example of unmodified PEO of initial approximate molecular weight of 200,000 g/mol.

Although the invention has been demonstrated by the Examples, it is understood that the PEO, the polar vinyl monomer, the initiator and the conditions can be varied depending on the type of modified PEO composition and properties desired.

TABLE 1

Components and Process Conditions of the Examples

| Example Number | Resin | Resin Rate (lb/hr) | Monomer | Monomer Rate (lb/hr) | Initiator | Initiator Rate (lb/hr) |
| --- | --- | --- | --- | --- | --- | --- |
| 1 | POLYOX 205 | 20 | — | 0 | — | 0 |
| 2 | POLYOX 205 | 20 | HEMA | 0.60 | L101 | 0.048 |
| 3 | POLYOX 205 | 20 | HEMA | 0.98 | L101 | 0.056 |
| 4 | POLYOX 205 | 20 | PEG-MA | 0.62 | L101 | 0.042 |
| 5 | POLYOX 205 | 20 | PEG-MA | 0.98 | L101 | 0.064 |
| 6 | POLYOX 12K | 20 | — | 0 | — | 0 |
| 7 | POLYOX 12K | 20 | HEMA | 0.70 | L101 | 0.052 |
| 8 | POLYOX 12K | 20 | HEMA | 1.00 | L101 | 0.062 |
| 9 | POLYOX 12K | 20 | PEG-MA | 0.70 | L101 | 0.052 |
| 10 | POLYOX 12K | 20 | PEG-MA | 1.00 | L101 | 0.064 |
| 11 | POLYOX 205 | 20 | HEMA | 0.16 | L101 | 0.038 |
| 12 | POLYOX 205 | 20 | HEMA | 0.22 | L101 | 0.032 |
| 13 | POLYOX 205 | 20 | HEMA | 0.36 | L101 | 0.038 |
| 14 | POLYOX N-750 | 20 | — | 0 | — | 0 |
| 15 | POLYOX N-750 | 20 | HEMA | 0.20 | L101 | 0.034 |
| 16 | POLYOX N-750 | 20 | HEMA | 0.62 | L101 | 0.037 |
| 17 | POLYOX N-3000 | 20 | — | 0 | — | 0 |
| 18 | POLYOX N-3000 | 20 | HEMA | 0.22 | L101 | 0.039 |
| 19 | POLYOX N-3000 | 20 | HEMA | 0.66 | L101 | 0.034 |
| 20 | POLYOX 205 | 20 | — | 0 | L101 | 0.024 |
| 21 | POLYOX N-80 | 25 | — | 0 | — | 0 |

The actual processing conditions during extrusion of the unmodified and modified PEO Examples listed in Table 1 were recorded and are reported in Table 2. Two extrusion runs were made for each of the reactive-extrusion Examples, 2–5 and 7–10, and are reported as second values 2'–5' and 7'–10', respectively. $T_1$ through $T_7$ represent the actual barrel temperatures of the seven zones of the extruder during the extrusion of the Examples. $T_1$ corresponds to barrels #2 and #3, $T_2$ corresponds to barrels #4 and #5, $T_3$ corresponds to barrels #6 and #7, $T_4$ corresponds to barrels #8 and #9, $T_5$ corresponds to barrels #10 and #11, $T_6$ corresponds to barrels #12 and #13, and $T_7$ corresponds to barrel #14, the die. Barrel #1 was not heated and remained at ambient conditions.

TABLE 2

Extrusion Conditions Observed

| Example Number | Screw Speed (rpm) | $T_1$ (° C.) | $T_2$ (° C.) | $T_3$ (° C.) | $T_4$ (° C.) | $T_5$ (° C.) | $T_6$ (° C.) | $T_7$ (° C.) | $T_{melt}$ (° C.) | $P_{melt}$ (psi) | Torque (%) |
|---|---|---|---|---|---|---|---|---|---|---|---|
| N-80 | 300 | 171 | 180 | 179 | 180 | 180 | 180 | 179 | 192 | 300–400 | 30–35 |
| 1 | 300 | 174 | 181 | 179 | 180 | 182 | 180 | 186 | 204 | 1770–1810 | 32–36 |
| 2 | 300 | 175 | 180 | 180 | 181 | 180 | 179 | 186 | 198 | 970–1130 | 29–31 |
| 2' | 300 | 175 | 180 | 180 | 181 | 180 | 179 | 186 | 198 | 970–1130 | 29–31 |
| 3 | 300 | 177 | 180 | 182 | 182 | 180 | 183 | 176 | 189 | 920–1120 | 28–31 |
| 3' | 300 | 185 | 180 | 179 | 180 | 181 | 180 | 175 | 189 | 940–1140 | 29–31 |
| 4 | 300 | 180 | 181 | 180 | 180 | 182 | 179 | 180 | 192 | 680–760 | 25–29 |
| 4' | 300 | 178 | 180 | 180 | 179 | 182 | 180 | 182 | 192 | 670–750 | 25–29 |
| 5 | 300 | 175 | 180 | 180 | 181 | 181 | 179 | 180 | 192 | 690–860 | 27–30 |
| 5' | 300 | 178 | 179 | 181 | 180 | 181 | 180 | 181 | 192 | 670–840 | 28–30 |
| 6 | 300 | 166 | 181 | 183 | 182 | 179 | 182 | 192 | 209 | 1540–1660 | 40–44 |
| 7 | 300 | 182 | 180 | 179 | 181 | 181 | 180 | 178 | 190 | 990–1080 | 28–30 |
| 7' | 300 | 176 | 180 | 179 | 180 | 180 | 181 | 178 | 190 | 990–1070 | 28–30 |
| 8 | 300 | 173 | 180 | 182 | 180 | 180 | 181 | 173 | 186 | 1140–1200 | 31–33 |
| 8' | 300 | 176 | 178 | 178 | 180 | 181 | 181 | 181 | 187 | 1010–1150 | 29–31 |
| 9 | 300 | 177 | 180 | 180 | 179 | 179 | 180 | 179 | 191 | 640–870 | 26–29 |
| 9' | 300 | 181 | 180 | 182 | 182 | 181 | 181 | 179 | 191 | 620–850 | 27–30 |
| 10 | 300 | 174 | 179 | 178 | 180 | 182 | 180 | 177 | 188 | 710–890 | 30–32 |
| 10' | 300 | 175 | 180 | 178 | 182 | 179 | 183 | 171 | 183 | 690–800 | 28–30 |
| 11 | 300 | 177 | 180 | 180 | 181 | 180 | 181 | 190 | 200 | 713 | 28 |
| 12 | 300 | 179 | 181 | 180 | 181 | 179 | 180 | 191 | 202 | 800 | 28 |
| 13 | 300 | 177 | 180 | 181 | 180 | 180 | 180 | 192 | 202 | 899 | 30 |
| 14 | 300 | 178 | 180 | 180 | 180 | 180 | 181 | 184 | 198 | 1379 | 33 |
| 15 | 300 | 180 | 181 | 180 | 180 | 180 | 180 | 192 | 202 | 644 | 26 |
| 16 | 300 | 180 | 180 | 180 | 180 | 180 | 180 | 194 | 204 | 628 | 28 |
| 17 | 300 | 180 | 181 | 180 | 180 | 180 | 180 | 182 | 200 | 1659 | 33 |
| 18 | 300 | 181 | 181 | 180 | 180 | 181 | 180 | 190 | 201 | 644 | 26 |
| 19 | 300 | 179 | 180 | 179 | 180 | 180 | 180 | 190 | 201 | 779 | 27 |
| 20 | 300 | 179 | 180 | 181 | 181 | 180 | 180 | 190 | 198 | 313 | 26 |

When the unmodified high molecular weight PEO resins, Examples 1 and 6, were extruded under the above processing conditions, the melt pressure during extrusion of the unmodified PEO resins was very high. The melt pressure of the unmodified 600,000 molecular weight PEO of Example 1 was 1770–1810 psi and the melt pressure of the unmodified 1,000,000 molecular weight PEO of Example 6 was 1540–1660 psi. Intense shear heating in the extruder caused the melt temperatures of the unmodified PEO resins to significantly increase, by 24 and 29° C., over the extruder barrel temperature of 180° C. The melt temperature increased to 204° C. during the extrusion of the unmodified 600,000 molecular weight PEO of Example 1 and increased to 209° C. during the extrusion of unmodified 1,000,000 molecular weight PEO of Example 6. These factors contributed to severe melt fracture and thermal degradation during the extrusion of unmodified high molecular weight PEO resins resulting in the production of undesirable strands. The undesirable strands were characterized by wider strands than intended, broken strands, bead-connected strands and rough strands.

At higher screw speed, 400 rpm, and lower throughput, approximately 5–10 pounds per hour, the melt fracture was reduced somewhat. However, under these conditions, the degradation of PEO appeared to be even more severe with significantly more bubbles evolving inside the strands as they exited the die due to the increase in residence time in the extruder. The exiting polymer strands had a foam-like appearance which is undesirable. Additionally, extruder setting of 5 pounds per hour is an extremely low setting and is not practical for commercial applications.

For the grafting process of modified high molecular weight PEO resins under the same conditions, Examples 2–5 and 7–10, melt fracture was not visible producing strands with smooth surfaces. Melt temperatures were significantly reduced as shown in Table 2. The melt temperatures grafting HEMA and PEG-MA to POLYOXO® WSR 205 PEO powders of Examples 2–5 were in the range of 189 to 198° C., a reduction of 6 to 15° C. compared to the melt temperature of the same PEO resin without grafting of Example 1 at 204° C. The strands also appeared to undergo less degradation, as the polymer strands contained less bubbles and were significantly smoother as they exited the die. The melt temperatures for the grafting of HEMA or PEG-MA to POLYOX® WSR 12K PEO, Examples 7–10, were also substantially reduced, down to the range of 183 to 191° C. compared to 209° C. without grafting, Example 6, a reduction of 18 to 26° C. This reduction in the melt temperature also apparently reduced the degradation inside the extruder, as the polymer strands contained less bubbles as they exited the die compared to the same PEO resin without grafting.

Examples 14 and 17 showed some melt fracture and thermal degradation, although not as bad as observed for Examples 1 and 6. The most obvious problems with extrusion of Examples 14 and 17 were the elevated melt pressure, 1379 and 1659 psi, and increased torque, 33 and 33%. For the modified PEO of Examples 15, 16, 18, and 19, the melt pressure was reduced by greater than 50% compared to the unmodified PEO of the same starting molecular weight and the torque was reduced slightly for each, from 33% down to 26–28%. The melt temperature was not reduced for these Examples.

Example 20, POLYOX® WSR 205 PEO modified by the addition of initiator only, showed a remarkable change in melt extrusion compared to Example 1, the unmodified POLYOX® WSR 205 PEO. Melt pressure was reduced from 1770–1890 psi to 313 psi. Torque was reduced from 32–36% to 26%. And, melt temperature was reduced from 204° C. to 198° C. These changes were expected to have resulted primarily from chemical degradation of PEO in the presence of the free radical initiator, the same mechanism of chemical degradation that occurred for Examples 2–5, 7–13, 15, 16, 18 and 19. However, because Example 20 was modified without the use of a monomer, the preferential reaction was crosslinking as opposed to grafting. The resulting material was filled with crosslinked gel particles, some as large as 0.5 to 1 mm. The gels rendered the resulting PEO useless.

Crosslinked gels were not observed, or were significantly reduced in both size and number, for the modified PEOs of Examples 2–5, 7–13, 15–16 and 18–19. It is believed that the initiator preferentially reacted with the monomer causing grafting and chain scission instead of crosslinking. The modified PEOs of Examples 2–5, 7–13, 15–16 and 18–19 have beneficial properties for thermal processing into thin films and are useful for producing commercially useful articles, such as disposable personal care products In general, the modified PEO of Examples 2–5, 7–13, 15–16 and 18–19 exhibited reduced melt temperature and melt pressure compared to the corresponding unmodified high molecular weight PEO. This allows for easier and more economical processing of PEO. The appearance of extrusion-processed PEO modified in accordance with this invention is greatly improved compared to unmodified high molecular weight PEO. Strands extruded from PEO modified in accordance with this invention are much smoother and much more uniform compared to strands extruded from the same initial unmodified PEO. The smoothness and uniformity of strands extruded from the modified PEO of Example 2–5, 7–13, 15–16 and 18–19 is comparable with the smoothness and uniformity of strands extruded from much lower approximate molecular weight PEO but with the greater mechanical properties of higher molecular weights.

GPC Analysis

The number-average molecular weight ($M_n$), the weight-average molecular weight ($M_w$), the z-average molecular weight ($M_z$), and the polydispersity index ($M_w/M_n$) of the Examples were determined by gel permeation chromatography (hereinafter GPC). The GPC analysis was conducted by American Polymer Standards Corporation of Mentor, Ohio, for the Examples of Table 1 and also for unmodified and unextruded POLYOX® WSR 205 and POLYOX® WSR 12K PEO powders. The results of the GPC analysis are reported in Table 3. The first two rows of Table 3 report the results of the GPC analysis for the POLYOXO® WSR 205 and POLYOX® WSR 12K PEO powders before extrusion. Examples 1 and 6 are the results for the GPC analysis of the unmodified and extruded POLYOX® WSR205 and POLYOX® WSR 12K PEOs of Examples 1 and 6 of Table 1, respectively. That is Examples 1 and 6 represent the extrusion of the above POLYOX® PEO resins at 180° C., 300 rpm and 20 pounds per hour in the ZSK-30 extruder without the additions of either monomer or initiator. The other Example numbers correspond to the respective Example numbers of Table 1.

TABLE 3

Molecular Weights and Polydispersity Indices

| Example | $M_n$ | $M_w$ | $M_z$ | $M_w/M_n$ |
| --- | --- | --- | --- | --- |
| POLYOX 205 | 77,400 | 1,000,000 | 6,560,000 | 12.92 |
| POLYOX 12K | 56,000 | 1,120,000 | 7,980,000 | 20.00 |
| 1 | 46,500 | 582,000 | 4,470,000 | 12.52 |
| 2 | 44,200 | 227,900 | 1,100,000 | 5.16 |
| 3 | 48,800 | 224,700 | 1,100,000 | 4.60 |
| 4 | 44,100 | 179,400 | 780,000 | 4.07 |

TABLE 3-continued

Molecular Weights and Polydispersity Indices

| Example | $M_n$ | $M_w$ | $M_z$ | $M_w/M_n$ |
| --- | --- | --- | --- | --- |
| 5 | 47,200 | 210,500 | 940,000 | 4.46 |
| 6 | 47,000 | 671,800 | 6,060,000 | 14.29 |
| 7 | 55,800 | 248,100 | 1,140,000 | 4.45 |
| 8 | 57,800 | 279,800 | 1,340,000 | 4.84 |
| 9 | 45,900 | 211,600 | 1,650,000 | 4.61 |
| 10 | 52,400 | 213,200 | 1,500,000 | 4.07 |

Significant reductions in molecular weights and the polydispersity indices were observed after reactive-extrusion of PEO with the monomer and the initiator of Examples 2–5 and 7–10 compared to the unmodified, extruded PEO of Examples 1 and 6. Along with the changes in molecular weight and the polydispersity index, a vast improvement in processability was observed. The most remarkable change in molecular weight distribution is observed in the reduction of the polydispersity index, which decreased from 12.52 for unmodified 600,000 g/mol PEO down to 4.07–5.16 for the same starting PEO modified in accordance with the invention and from 14.29 for unmodified 1,000,000 g/mol PEO down to 4.07–4.84 for the same starting PEO modified in accordance with the invention.

GPC analysis was not conducted for Examples 11–20. However, it is believed that the modified PEOs of Examples 11–13, 15–16 and 18–19 would have reduced weight average molecular weights and polydispersity indices compared to the corresponding unmodified PEOs.

DSC Analysis of Thermal Properties

The unmodified and modified PEO compositions of Examples 1–19 were analyzed by Differential Scanning Calorimetry (DSC) to determine differences in thermal properties between the modified and unmodified PEO resins. Example 20 was not analyzed by DSC because the PEO of Example 20 modified without the addition of a monomer was determined to not be useful for film-making. The melting points ($T_m$) and enthalpy of melting ($\Delta H$) values for Examples 1–19 are reported in Table 4.

TABLE 4

Thermal Properties

| Example Number | $T_m$ (° C.) | $\Delta H$ (J/g) |
| --- | --- | --- |
| 1 | 71.66 | 137.7 |
| 2 | 66.63 | 139.1 |
| 3 | 64.94 | 136.7 |
| 4 | 65.26 | 137.7 |
| 5 | 63.46 | 138.2 |
| 6 | 70.72 | 137.4 |
| 7 | 66.07 | 131.5 |
| 8 | 65.45 | 134.2 |
| 9 | 65.99 | 138.9 |
| 10 | 64.75 | 135.3 |
| 11 | 68.7 | 136.6 |
| 12 | 67.4 | 134.1 |
| 13 | 68.2 | 137.3 |
| 14 | 68.6 | 142.7 |
| 15 | 66.9 | 141.7 |
| 16 | 67.0 | 138.5 |
| 17 | 70.3 | 128.4 |
| 18 | 65.9 | 137.0 |
| 19 | 65.7 | 135.3 |
| 20 | — | — |

The melting points as determined by DSC of the modified PEOs of Examples 2–5 and 11–13 are lower than for the initial unmodified of Example 1. Likewise, decreases in melting points were observed for the modified PEOs of Examples 7–10 compare to the initial unmodified PEO of Example 6, for the modified PEOs of Examples 15 and 16 compared to the unmodified PEO of Example 14, and for the modified PEOs of Example 18 and 19 compared to the initial unmodified PEO of Example 17. These measured decreases in melting points for the modified PEOs are additional evidence of modification and are beneficial for thermal processing.

Melt Rheology

Figure 2:
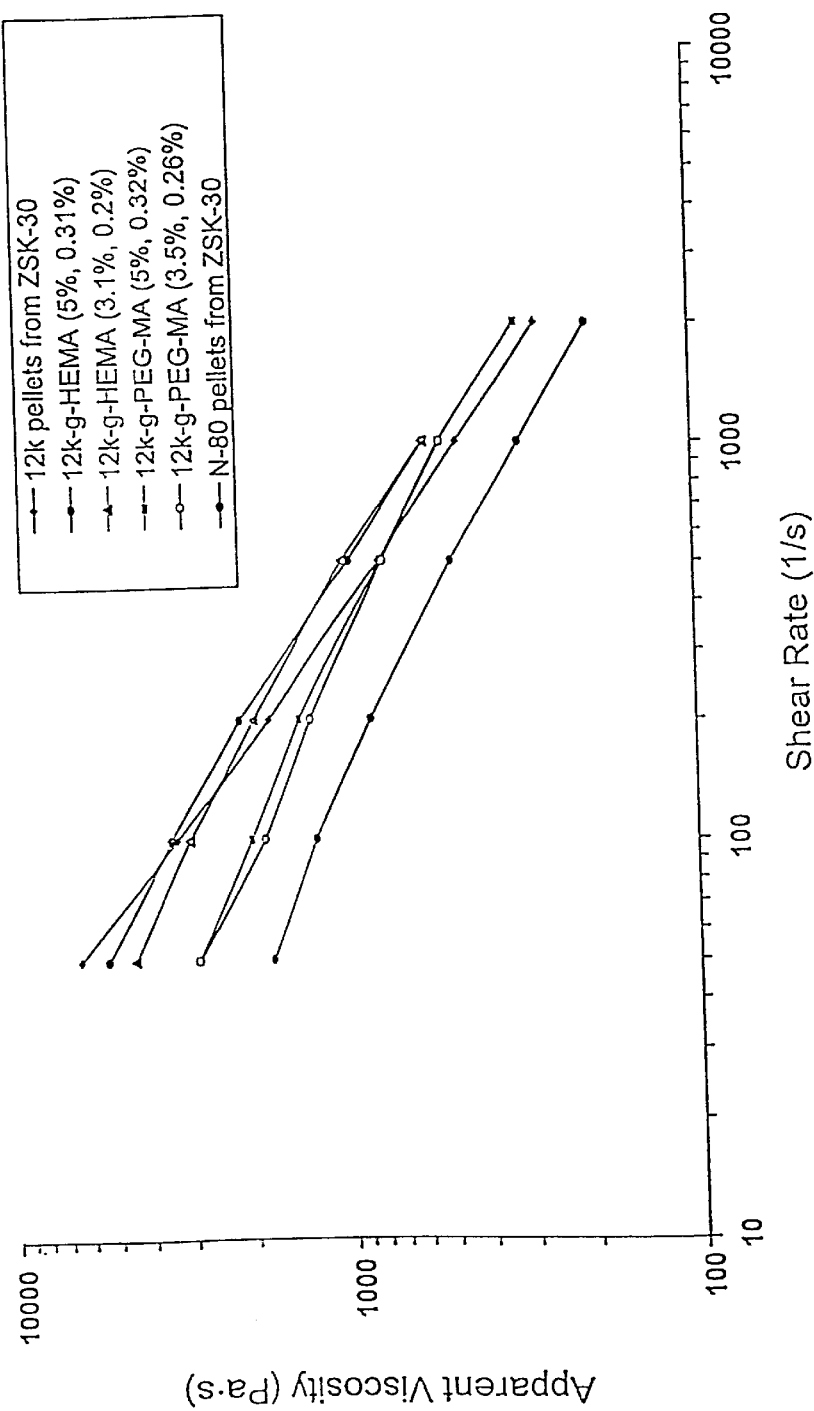
FIG. 2 compares the melt rheology curve of unmodified PEO resin of 1,000,000 g/mol approximate molecular weight, Example 6, and the melt rheology curves of PEO compositions modified from the 1,000,000 g/mol molecular weight PEO resin, Examples 7–10.
Figure 4:
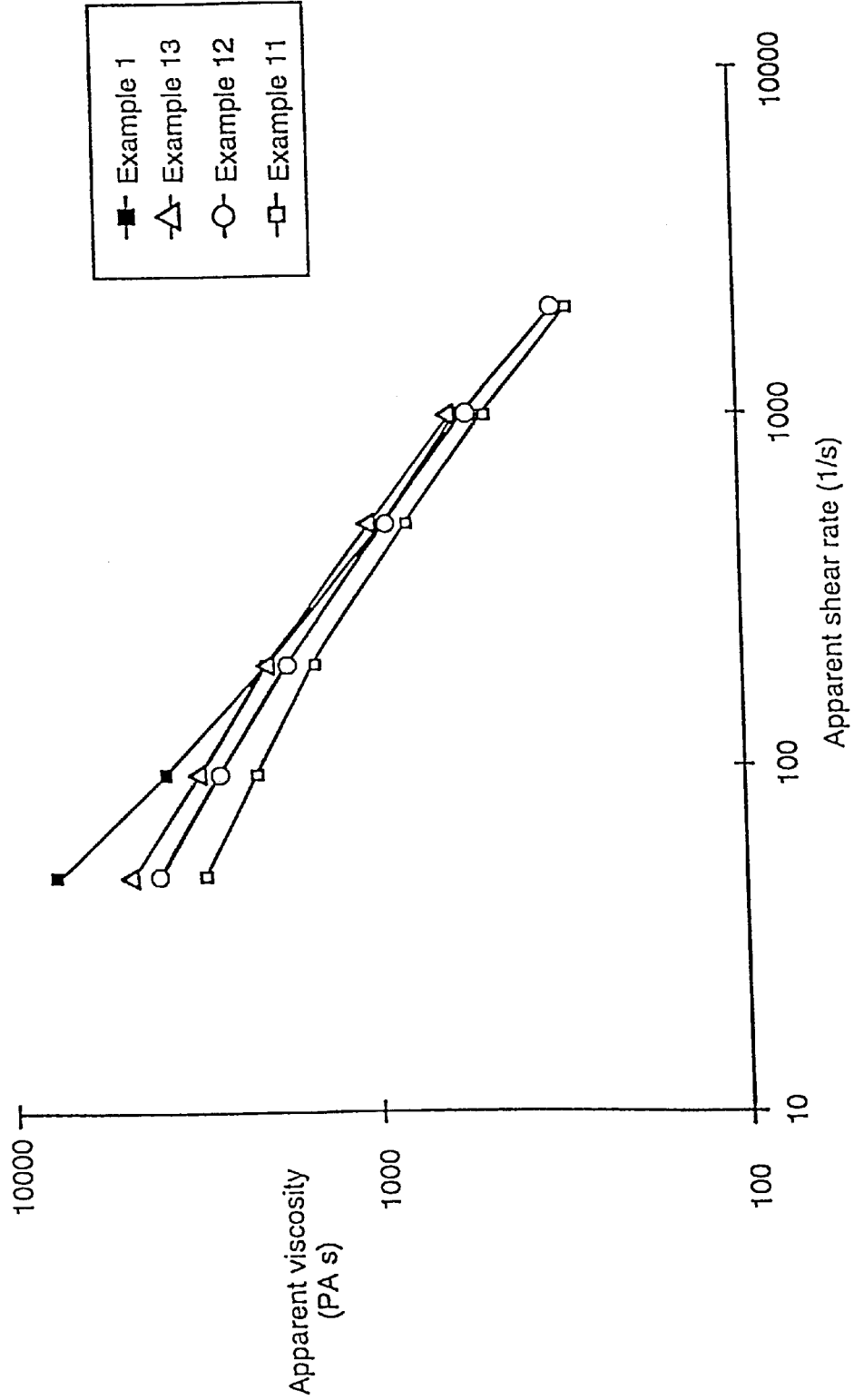
FIG. 4 compares the melt rheology curve of an unmodified PEO resin of 600,000 g/mol approximate molecular weight, Example 1, and the melt rheology curves of PEO compositions modified from the PEO resin having an initial approximate molecular weight of 600,000 glmol with low monomer and initiator levels, Examples 11–13.
Figure 5:
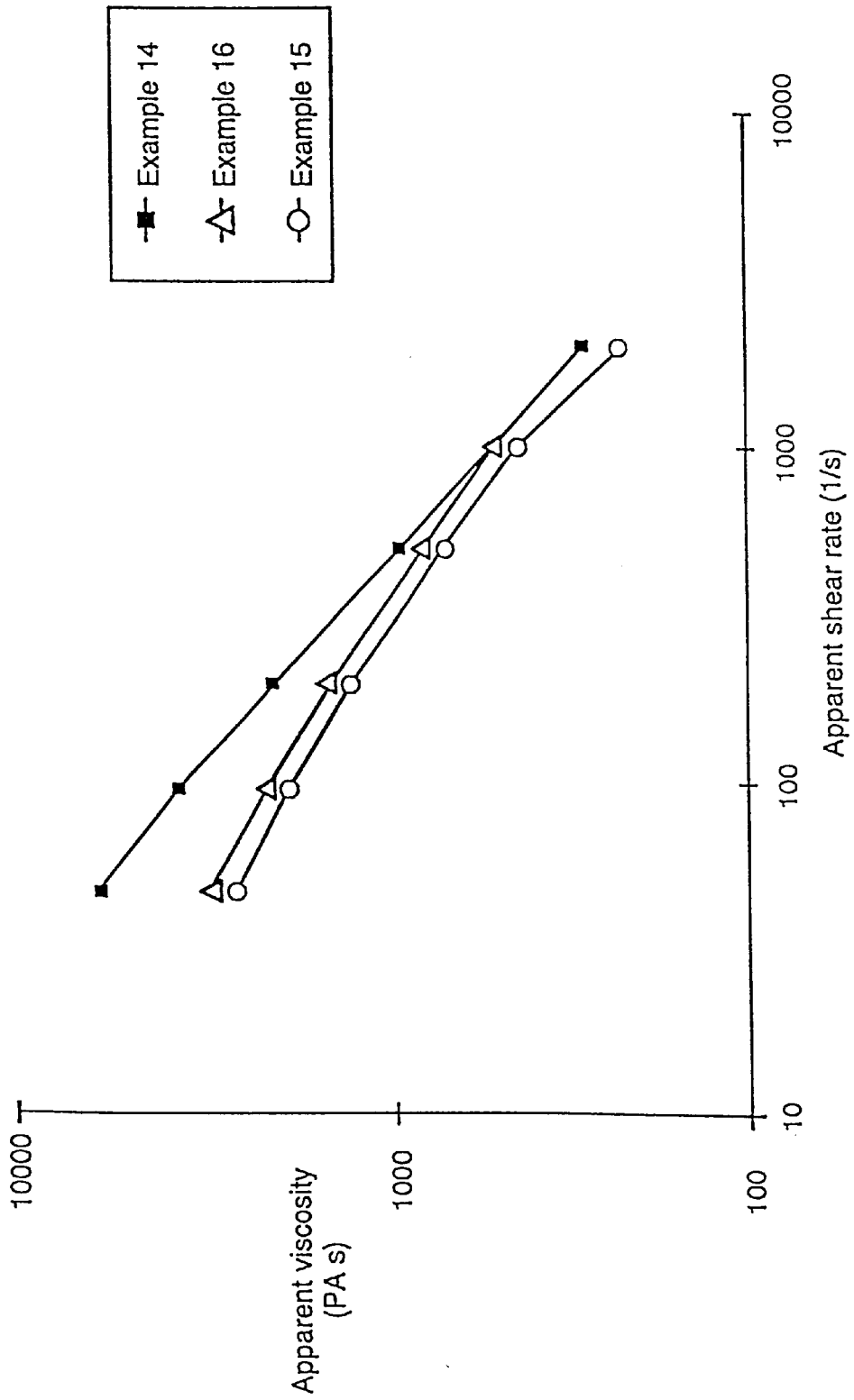
FIG. 5 compares the melt rheology curve of an unmodified PEO of 300,000 g/mol approximate molecular weight, Example 14, and the melt rheology curves of PEO compositions modified from the PEO resin having an initial approximate molecular weight of 300,000 g/mol, Examples 15 and 16.
Figure 6:
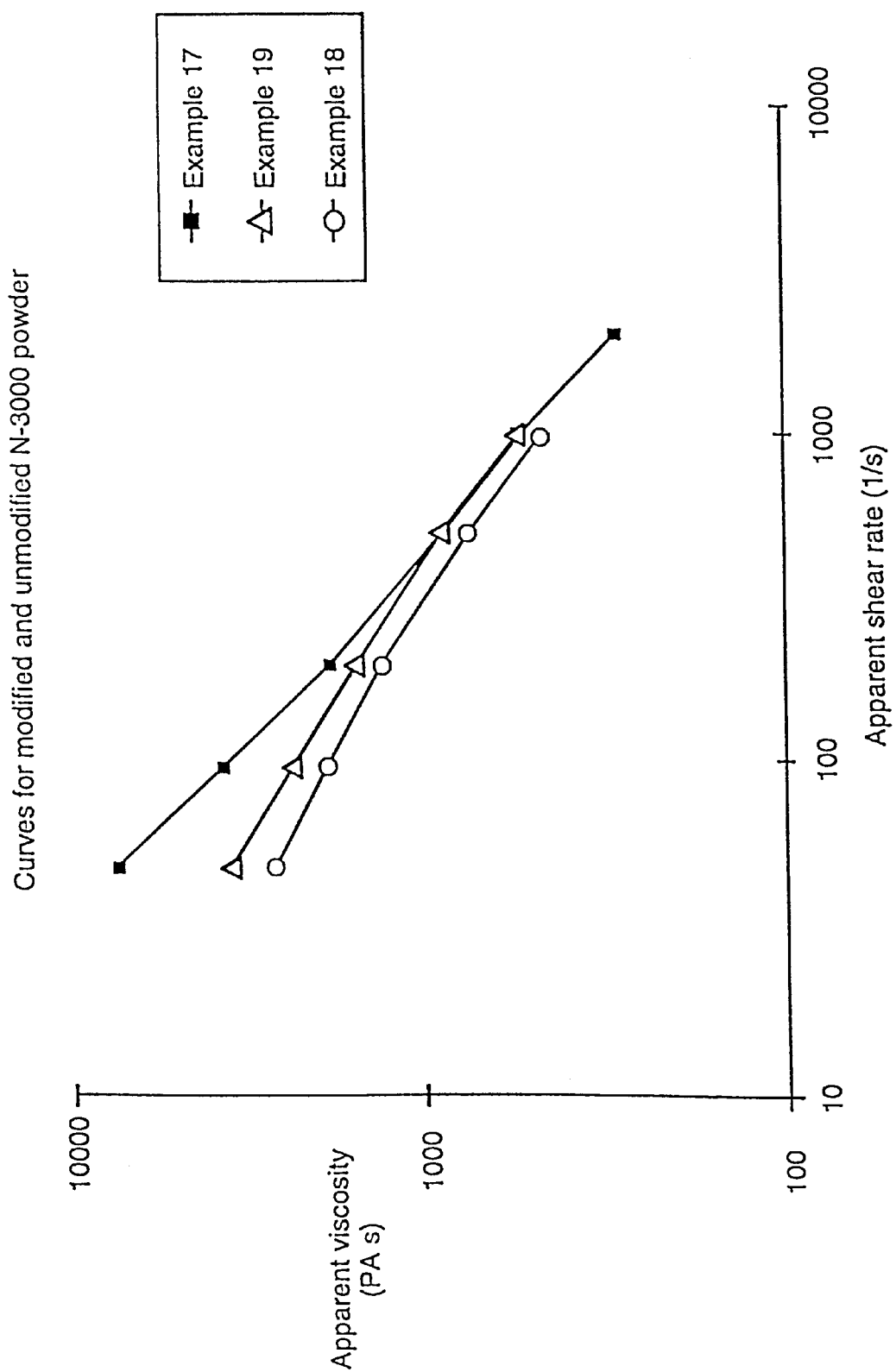
FIG. 6 compares the melt rheology curve of an unmodified PEO of 400,000 g/mol approximate molecular weight, Example 17, and the melt rheology curves of PEO compositions modified from the PEO having an initial approximate molecular weight of 400,000 g/mol, Examples 18 and 19.

The melt rheology curves for unmodified, Example 1, and modified, Examples 2–5, 600,000 g/mol initial approximate molecular weight resin compositions are provided in FIG. 1. The melt rheology curves for unmodified, Example 6, and modified, Examples 7–10, 1,000,000 g/mol initial approximate molecular weight resin compositions are provided in FIG. 2. The melt rheology curves for unmodified, Example 1, and modified, Examples 11–13, 600,000 g/mol initial approximate molecular weight resin compositions are provided in FIG. 4. The melt rheology curves for unmodified, Example 14, and modified, Examples 15 and 16, 300,000 g/mol initial approximate molecular weight resin compositions are provided in FIG. 5. The melt rheology curves for unmodified, Example 17, and modified, Examples 18 and 19, 400,000 g/mol initial approximate molecular weight resin compositions are provided in FIG. 6.

The results show that the melt viscosities of the modified PEOs are significantly reduced at low shear rates, 50–100 $s^{-1}$, than the melt viscosities of the unmodified PEO. For example, the melt viscosity of unmodified 12K 1,000,000 approximate molecular weight PEO resin is 6,433 Pa*s at 50 $s^{-1}$ and the melt viscosity of the same 12K resin modified with 5% PEG-MA and 0.32% L101 initiator is 2,882 Pa*s at the same shear rate, 50 $s^{-1}$. This is a reduction in melt viscosity of 55%.

However, at higher shear rates, especially 500–2,000 $s^{-1}$, the melt viscosities of the modified PEOs appear to be comparable or greater than the melt viscosities of the unmodified PEO. The melt viscosity of unmodified 12K resin was 275 Pa*s at 2,000 $s^{-1}$ and the melt viscosity of the same 12K resin modified with 5% PEG-MA and 0.32% L101 initiator is 316 Pa*s at the same shear rate, 2,000 $s^{-1}$. This is an increase in melt viscosity of 15%.

Overall, the slopes of the apparent viscosity versus shear rate decreased after modification.

NMR Analysis

The modified PEO of the Examples were analyzed by NMR spectroscopy. The results of this analysis confirmed that modified PEO did in fact contain grafted HEMA or PEG-MA units as side chains on the PEO backbone. By NMR spectroscopy, it was determined that the PEOs produced in the Examples 2–5, 7–13, 15–16 and 18–19 contained 0.65 to 2.58 percent grafted HEMA or PEG-MA side chains and 0 to 2.39 percent unreacted or ungrafted HEMA or PEG-MA.

Film-Casting Process

The unmodified, extruded PEO resins of Examples 1, 6, 14, 17, and 21 were pelletized and attempts were made to process these unmodified, extruded PEO resins into thin films. For the film processing, a Haake counter-rotating twin screw extruder was used with either a 4 inch or 8 inch wide film die attachment. The temperature profile for the heating zones of the Haake extruder was 170, 180, 180 and 190° C. The screw speed was adjusted in the range of 15–50 rpm depending on the film thickness attempted. Screw speed and wind-up speed were adjusted such that a film with a thickness within the range of 2 to 4 mil was produced. The process was allowed to stabilize so that film samples could be collected and observed. The extruded films were collected onto a chilled wind-up roll maintained at 15–20° C.

The Haake extruder that was used to cast the films from the PEO compositions was a counter-rotating, twin-screw extruder that contained a pair of custom-made, counter rotating conical screws with the 4 inch wide film die attachment. The Haake extruder comprised six sections as follows: Section 1 comprised a double-flighted forward pumping section having a large screw pitch and high helix angle. Section 2 comprised a double-flighted forward pumping section having a smaller screw pitch than Section 1. Section 3 comprised a double flighted forward pumping section having a smaller screw pitch than Section 2. Section 4 comprised a double-flighted and notched reverse pumping section where one complete flight was notched. Section 5 comprised a double flighted and notched forward pumping section containing two complete flights. And, Section 6 comprised a double flighted forward pumping section having a screw pitch intermediate that of Section 1 and Section 2. The extruder had a length of 300 millimeters. Each conical screw had a diameter of 30 millimeters at the feed port and a diameter of 20 millimeters at the die. Although the above extruder is described in detail, it should be noted that a variety of extruders and apparatuses can be used to process PEO films.

The unmodified, extruded PEO resins of Examples 1 and 6 were not able to be processed into thin films. Only thick sheets of thicknesses greater than about 7 mil were able to be produced. Even these thick sheets exhibited severe melt fracture. The rigidity and the melt fracture of the sheets gave the sheets an undesirable saw-like appearance with sharp "teeth" at the edges. Unmodified PEO resins are not able to be thermally processed into thin films under normal processing conditions.

The unmodified, extruded PEO resin of Example 14, having the lowest weight of the high molecular weight PEO resins tested, was the most processable of the unmodified, high molecular weight PEOs. However, the unmodified PEO of Example 14, the POLYOX® WSR N-750 PEO with an initial approximate molecular weight of 300,000 g/mol, was still very difficult to process into a uniform sheet of about 4 mil thickness. All attempts to process a film of less than 4 mil thickness, resulted in breaking, surging, and very uneven films. The minimum thickness film that was able to be processed from the unmodified 400,000 g/mol PEO of Example 17 was only about 5 mil.

The PEO composition of Example 20 could only be processed into a film of about 3–4 mil in thickness. However, the 3–4 mil films of the PEO of Example 20 contained numerous fish-eye holes. Even though the torque and pressure during the processing of films of Example 20 were low, the films contained so many gel inclusions that the gel inclusions propagated defects in the films. At less than 3–4 mil, the fish-eye holes would became so large that they interconnected and caused breaks in the films.

The only unmodified PEO that was able to be processed into a thin film was the low molecular weight, 200,000 g/mol, POLYOX® WSR N-80 PEO of Example 21. However, the films processed from the unmodified low molecular weight PEO of Example 21 possess insufficient mechanical properties, such as low tensile strength and low ductility, and also exhibit increased brittleness during storage under ambient conditions. Additionally, the film processed from the unmodified PEO of Example 21 contained undesirable, grainy particles. These deficiencies make unmodified PEO resins impractical for commercial use in personal care products.

In contrast, films were successfully processed from to the extruded, modified PEO compositions. Films were melt processed from the PEO compositions of Examples 2–5, 7–13, 15–16, and 18–19 using the same processing apparatus and conditions as attempted for films processed from the unmodified PEO compositions, Examples 1, 6, 14, 17, 20 and 21, as detailed above. Uniform films of about 3 mil in thickness were made. The screw speed, torque, pressure and die temperature for the processing of films from the Examples were measured and averages of the measurements are reported in Table 5.

TABLE 5

Film Processing Conditions

| Example | Screw Speed (rpm) | Torque (m*g) | Pressure (psi) | Die Temperature (° C.) |
|---|---|---|---|---|
| 1 | 150 | 5922 | 1850 | 216 |
| 2 | 50 | 4411 | 746 | 208 |
| 3 | 40 | 4906 | 647 | 207 |
| 4 | 20 | 4195 | 497 | 206 |
| 5 | 20 | 3820 | 499 | 207 |
| 6 | — | — | — | — |
| 7 | 40 | 5130 | 771 | 207 |
| 8 | 50 | 5531 | 882 | 208 |
| 9 | 20 | 4276 | 528 | 207 |
| 10 | 25 | 4211 | 532 | 207 |
| 11 | 100 | 3800 | 540 | 213 |
| 12 | 100 | 4100 | 630 | 213 |
| 13 | 100 | 4500 | 700 | 213 |
| 14 | 100 | 7000 | 1350 | 216 |
| 15 | 100 | 4100 | 550 | 215 |
| 16 | 100 | 4000 | 520 | 214 |
| 17 | 100 | 5200 | 1400 | 215 |
| 18 | 100 | 3800 | 480 | 212 |
| 19 | 100 | 3700 | 600 | 213 |
| 20 | 100 | 2500 | 330 | 212 |
| 21 | 15 | 4211 | 532 | 207 |

Attempts were made to process films with acceptable solid state properties from higher molecular weight, unmodified PEO resins. These attempts were made using unmodified POLYOX® WSR 205 PEO and unmodified POLYOX® WSR 12K PEO, approximate molecular weights of 600,000 g/mol and 1,000,000 g/mol, respectively. The POLYOX® WSR 12K PEO could not be processed into a film. Thus, torque and pressure data were not collected for unmodified POLYOX® WSR 12K PEO, Example 6 of Table 5. The unmodified POLYOX® WSR 205 PEO could not be extruded at lower screw speeds. The torque and pressure observed during film processing of the modified POLYOX® WSR 205 PEO compositions of Examples 2–were dramatically reduced compared to unmodified POLYOX® WSR 205 PEO, Example 1. The unmodified higher modecular weight PEO resins were found to be impractical for extrusion into thin films due to their poor melt processability and inability to be processed into films of less than about 7 mil in thickness. Thus, high molecular unmodified PEO resins are impractical for melt processing.

In contrast, modified PEO compositions were able to be melt processed into films with thicknesses of less than 0.5 mil without tearing or breakage. This is a significant improvement compared to thicknesses of about 7 mil for films from the unmodified high molecular weight PEOs of Examples 1 and 6. The grafting of polar vinyl monomers onto PEO transforms the melt properties and processability, improving the processability by increasing the melt strength and melt drawability of the PEO, thereby allowing thin films to be readily and easily processed. This is also an improvement over the difficulties of producing a less than 1 mil film of unmodified low molecular weight PEO such as Example 21 which possesses desirable processing conditions of low torque, pressure and die temperature but lacks mechanical properties desirable in a usable film.

The modified PEO compositions of Examples 11–13 with lower levels of monomer addition processed comparably to the modified PEO compositions of Examples 2–5 also exhibiting reduced torque and pressure during processing compared to unmodified PEO processed under similar conditions. The modified PEO compositions of Examples 15 and 16 also exhibited significantly reduced torque and pressure and slightly reduced die temperature during processing compared to unmodified PEO of Example 14 when processed under similar conditions. Generally, the melt viscosity during film processing of the modified PEO compositions was reduced and the die pressure was reduced by greater than 50%.

Very thin films were able to be processed from the modified PEO compositions of Examples 15 and 16, exhibiting excellent processability. In contrast, the unmodified POLYOX® WSR N-750 PEO having an initial approximate molecular weight of 300,000 g/mol was not able to be processed into a film of less than 4 mil in thickness and would break or surge and become uneven in thickness during attempts to process films at 4 mil in thickness. Similarly, the modified PEO compositions of Examples 18 and 19 also exhibited significantly reduced torque and pressure and slightly reduced die temperature during processing compared to unmodified PEO of Example 17 when processed under similar conditions and were able to be processed into very thin films exhibiting excellent processability. In contrast, the unmodified POLYOXOR WSR N-3000 PEO of Example 17 was not able to be processed into a film of less than 5 mil in thickness and produced 5 mil films with jagged saw-toothed edges similar to those observed form Example 1.

In general, the modified PEO films did not stick to the chill roll. The modified PEO films produced were smooth and soft and did not contain any grainy particles, as did the extruded films of the unmodified low molecular weight PEO of Example 21. The films produced from the modified PEO compositions generally have better smoothness, softness and greater clarity than films similarly produced form unmodified PEO compositions. Thus, it has been discovered that the films from modified PEO compositions exhibit significantly improved film processability and may be more easily and economically processed into thin films useful for personal care applications in contrast to films from unmodified PEO compositions.

Tensile Properties of Modified PEO Films

Tensile tests were performed on the films produced from the compositions of Examples 2–13, 15, 16, 18–20 and the POLYOXO® WSR N-80 PEO resin as detailed above. The tensile properties of each of the films were tested and measured in the machine direction (MD) and the cross direction (CD) and are presented in Table 6.

TABLE 6

Tensile Properties of Films

| Sample or Example No. | Thickness (mil) MD | Thickness (mil) CD | % Strain-to-Break MD | % Strain-to-Break CD | Peak Stress (MPa) MD | Peak Stress (MPa) CD | Energy-to-Break (In * Lb) MD | Energy-to-Break (In * Lb) CD | Modulus (MPa) MD | Modulus (MPa) CD |
|---|---|---|---|---|---|---|---|---|---|---|
| 2  | 3.7 | 4.2 | 653 | 635 | 25.2 | 22.2 | 8.9  | 8.0  | 244 | 237 |
| 3  | 3.8 | 4.0 | 591 | 570 | 17.5 | 17.5 | 5.6  | 5.6  | 158 | 286 |
| 4  | 3.1 | 3.0 | 718 | 529 | 20.0 | 14.2 | 5.9  | 3.4  | 151 | 206 |
| 5  | 3.2 | 3.4 | 736 | 641 | 24.4 | 17.7 | 7.3  | 5.2  | 205 | 207 |
| 6  | 7.4 | —   | 814 | —   | 27.6 | —    | 6.4  | —    | 252 | —   |
| 7  | 3.2 | 3.5 | 693 | 551 | 29.2 | 15.4 | 8.2  | 4.1  | 241 | 253 |
| 8  | 3.1 | 3.4 | 718 | 532 | 37.4 | 15.1 | 11.6 | 3.7  | 277 | 265 |
| 9  | 3.0 | 3.2 | 722 | 538 | 24.3 | 16.7 | 6.8  | 4.2  | 218 | 305 |
| 10 | 3.2 | 3.2 | 739 | 638 | 25.8 | 17.8 | 7.8  | 4.9  | 214 | 192 |
| 11 | 3.5 | 4.0 | 701 | 730 | 26.3 | 25.3 | 8.7  | 9.8  | 340 | 412 |
| 12 | 3.9 | 4.2 | 764 | 698 | 33.2 | 28.0 | 12.2 | 10.5 | 294 | 427 |
| 13 | 3.6 | 3.7 | 753 | 659 | 37.0 | 27.0 | 11.9 | 8.4  | 289 | 390 |
| 15 | 2.6 | 2.5 | 742 | 709 | 27.1 | 23.8 | 7.0  | 5.8  | 307 | 407 |
| 16 | 3.2 | 2.9 | 768 | 736 | 30.6 | 24.6 | 9.1  | 6.9  | 242 | 303 |
| 18 | 3.3 | 3.2 | 788 | 723 | 30.4 | 26.3 | 10.0 | 8.0  | 359 | 425 |
| 19 | 2.0 | 2.4 | 554 | 577 | 26.7 | 23.3 | 3.8  | 4.5  | 293 | 413 |
| 20 | 7.0 | 7.0 | 9   | 8   | 8.2  | 8.4  | 0.08 | 0.07 | 255 | 263 |
| 21 | 3.5 | 3.5 | 121 | 53  | 12.1 | 12.0 | 0.8  | 0.3  | 283 | 321 |

The films processed from the unmodified POLYOX® WSR N-80 PEO resin of Example 21 possess low elongation-to-break values. The mechanical properties of the POLYOX® WSR N-80 PEO film were tested and measured within 24 hours of the processing of the film and are expected to increase considerably with aging. Only thick films, not less than 7.4 mil in thickness, are able to be processed from the unmodified POLYOX® WSR 12K PEO resin, Example 6. No cross direction properties could be measured for the films of Example 6 due to the large variations in thicknesses in the cross direction of the films.

The mechanical properties of films processed from four PEO compositions, Examples 2–5, modified from PEO resins having a molecular weight of 600,000 g/mol before modification were tested. These films have high elongation-to- break values ranging from 570 to 736 percent. These modified PEO compositions have molecular weights and molecular weight distributions similar to the molecular weight and molecular weight distribution of unmodified POLYOX® WSR N-80 PEO but have significantly improved mechanical properties compared to films processed from this unmodified, low molecular weight PEO resin. It is believed that these improved mechanical properties are brought about, at least in part, by increased interchain interactions between the modified PEO chains introduced by the grafting of HEMA and PEG-MA strands onto the PEO. Additionally, it is believed that the grafted polar groups result in hydrogen bonding between neighboring PEO chains linking the chains in both the melt and solid states.

Even modification of PEO resins with low levels of monomers produces improved mechanical properties. This is demonstrated by the high elongation-to-break, peak stress and energy-to-break measurements observed for the films of Examples 11, 12 and 13. The grafting, even at low levels, improves the fundamental properties of PEO thereby allowing thin films to be processed from PEO Overall, the films processed form the modified PEO compositions were found to have improved mechanical properties over films similarly processed from conventional resins. The modified PEO films showed dramatic improvements in tensile properties, greater than 600 percent in strain and 200 percent in stress in the machine direction and greater than 1400 percent in strain and 200 percent in stress in the cross direction. Additionally, the films produced from the modified PEO compositions were observed to have balanced properties in the machine direction versus the cross direction. These films exhibit improved high peak stresses and energy-to-break values. Most importantly, these films have reduced modulus values which demonstrates their improved flexibilities compared to films from unmodified PEO. The improved flexibility of the films containing modified PEO are particularly desirable for flushable applications, specifically, for flushable personal care products.

Qualitative FT-IR Analysis

Figure 3:
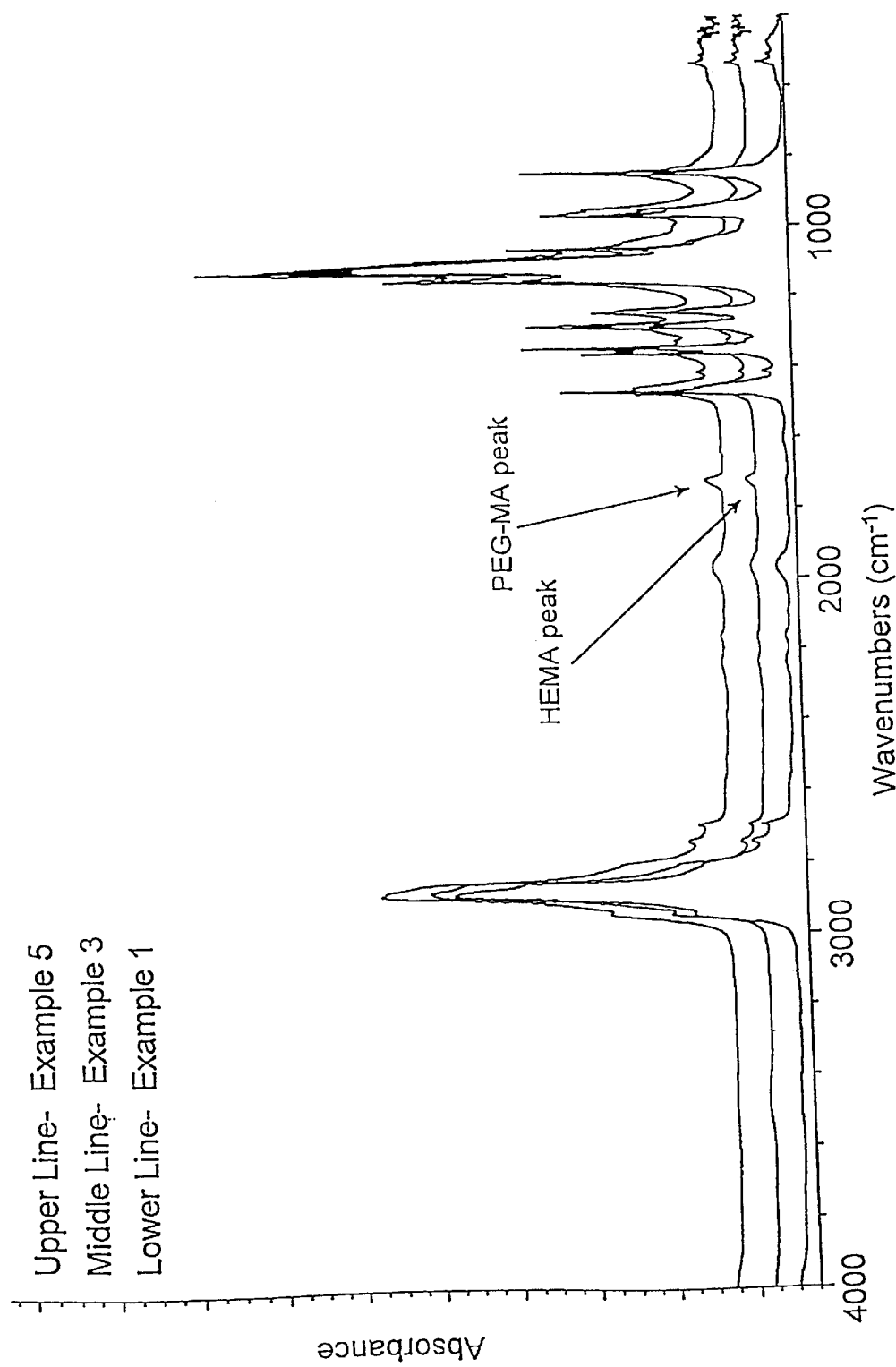
FIG. 3 displays the results of Fourier transform infrared spectra analysis of films from an unmodified PEO of 600,000 g/mol approximate molecular weight, Example 1; a PEO of an initial approximate molecular weight of 600,000 g/mol modified with 4.9 weight % HEMA and 0.28 weight % initiator, Example 3; and a PEO of an initial approximate molecular weight of 600,000 g/mol modified with 4.9 weight % PEG-MA and 0.32 weight % initiator, Example 5.

Fourier transform infrared spectroscopy analysis (FT-IR) was performed on thin films processed from the compositions of Examples 1, 3 and 5. The spectra that were obtained from this analysis are shown in FIG. 3. The lower line is the spectra observed for Example 1, the unmodified and extruded 600,000 g/mol approximate molecular weight PEO. The middle line is the spectra observed for Example 3, the 600,000 g/mol approximate molecular weight PEO grafted with 5% HEMA. And the upper line is the spectra observed for Example 5, the 600,000 glmol approximate molecular weight PEO grafted with 5% PEG-MA.

The small peaks observed at approximately 1,725 cm$^{-1}$ in the upper and middle spectra of Examples 5 and 3 respectively are the absorption peaks for PEG-MA and HEMA, respectively. This absorption peak, at approximately 1725 cm$^{-1}$, is not observed for unmodified PEO as shown in the lower spectra of FIG. 3.

Crystal Morphology

The film from the unmodified POLYOX® WSR 205 PEO having a reported initial approximate molecular weight of 600,000 g/mol of Example 1 and a film produced from a modified sample of the same initial resin were analyzed using polarized light microscopy. In addition to being of a greater thickness, the unmodified film possessed larger spherulite crystals than the film produced from the modified PEO under the same processing conditions. The spherulites in the unmodified sample were observed to be in the order to 20 to 50 micron in size, whereas the spherulites in the modified sample were not observable under the same magnification and are believed to be in the order of less than 1 micron in size. The crystalline structures of the films change dramatically due to grafting. It is believed that the improved mechanical properties of the films containing modified PEO are brought about, at least in part, by the changes in crystal morphology. Additionally, the resistance of the modified films to physical aging is expected to improve as a result of the observed improvement in crystalline structure.

COMPARATIVE EXAMPLE A

A PEO resin having a molecular weight of about 200,000 g/mol was processed through the Haake extruder under similar conditions as the following modified examples of the invention for comparative purposes and to demonstrate that conventional, unmodified PEO resins cannot be melt processed into fibers. The 200,000 g/mol molecular weight unmodified PEO resin that was used for this comparative example was obtained from Planet Polymer Technologies. The resin obtained from Planet Polymer Technologies was in pellet form and was compounded from POLYOX® WSR N-80 PEO resin manufactured by Union Carbide Corp.

For processing, the extruder barrel temperatures were set at 170, 180 and 180° C. for the first, second, third heating zones, respectively, and 190° C. for the die. The screw speed was set at 150 rpm. The PEO resin was fed into the extruder at a throughput of about 5 pounds per hour. No monomer or initiator was added to the PEO resin of Comparative Example A. The unmodified PEO was extruded under the above conditions, cooled in air and pelletized for later use. Attempts were made to melt process the unmodified PEO of Comparative Example A into fibers. Because the melted PEO of Comparative Example A had too low melt elasticity and too low melt strength to allow attenuation of the PEO melt, fibers could not be melt processed using conventional fiber-spinning techniques, such as Lurgi gun, starter gun and free fall. The PEO melt extruded from the spinning plate snapped easily and did not allow the unmodified PEO to be drawn into fibers. Only strands of about 1 to 2 millimeters in diameter were able to be produced from the unmodified PEO of Comparative A.

COMPARATIVE EXAMPLE B

A PEO resin having a molecular weight of about 100,000 g/mol was processed through the Haake extruder under the same conditions as above Comparative Example A. The 100,000 g/mol molecular weight PEO resin that was used for this Comparative Example B was obtained from Planet Polymer Technologies was in pellet form and was compounded from POLYOX® WSR N-10 PEO resin manufactured by Union Carbide Corp. Attempts were also made to melt process the unmodified PEO of Comparative Example B into fibers. Fibers of diameters of less than about 100 micrometers could not be melt processed from the unmodified 100,000 g/mol molecular weight PEO resin using conventional fiber-spinning techniques. Even then the melt could only be drawn very slowly and the melt was easily broken, making commercial production of fibers from PEO impractical. Thus, the Comparative Examples A and B demonstrate that prior art, unmodified PEO resins cannot be melt processed into fibers.

EXAMPLES
PEO Compositions Suitable for Fiber Making

The 100,000 g/mol POLYOX® WSR N-10 PEO resin was fed into the Haake extruder at 5.3 lb/hr along with 0.53 lb/hr of PEG-MA monomer and 0.026 lb/hr of LUPERSOL® 101 free radical initiator, Example 31 of Table 7. The 200,000 g/mol POLYOX® WSR N-80 PEO was modified in the same manner with the same monomer and initiator at the same relative amounts, Example 32 in Table 7. When monomer and initiator were added to the PEO base resins during extrusion, the melt elasticities and the melt strengths of the PEO resins were visibly improved. These modified PEO compositions were collected in bulk and then ground into a powder for further processing into fibers.

Figure 7:
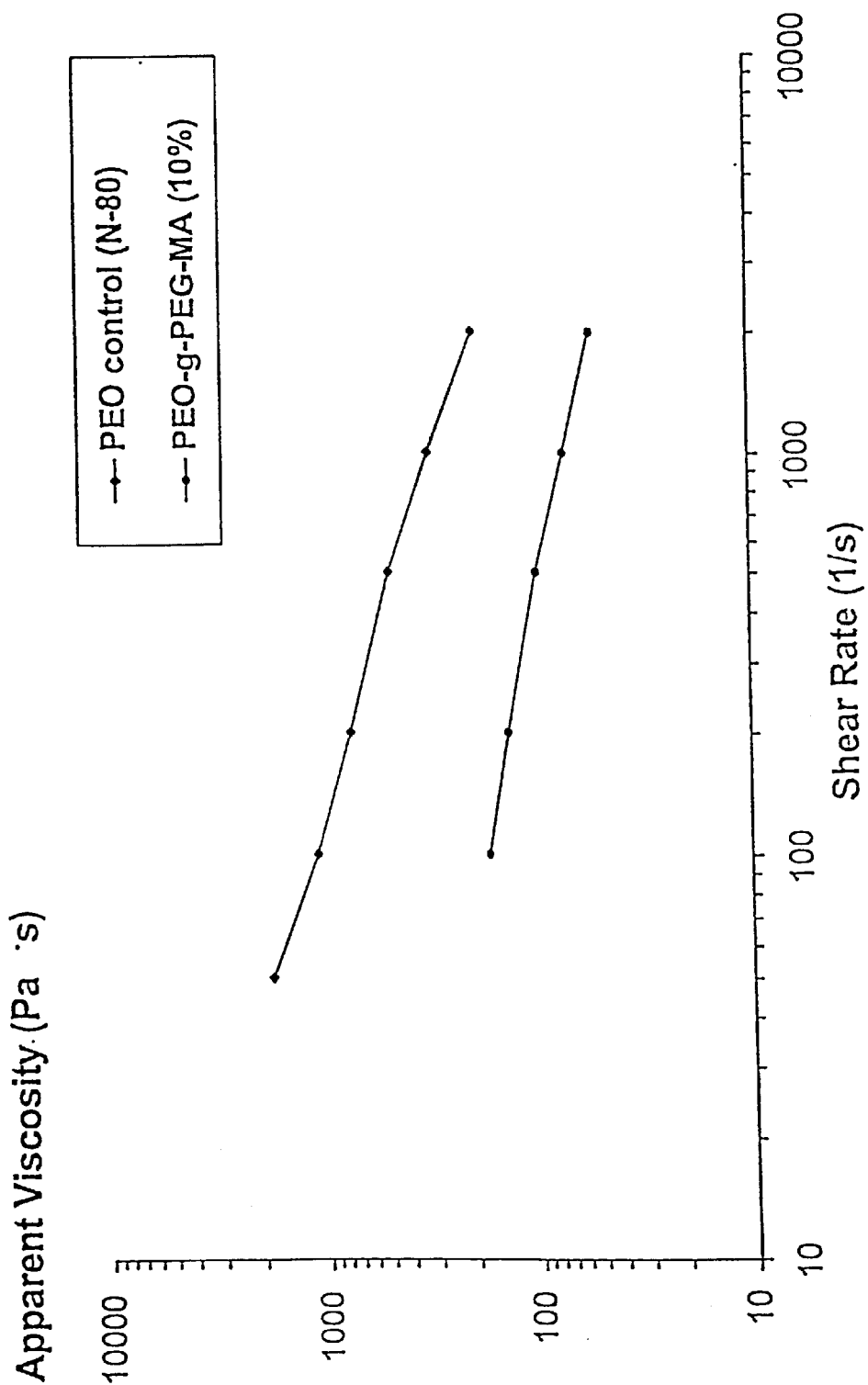
FIG. 7 is a graph comparing the melt viscosities of an unmodified 200,000 g/mol molecular weight PEO, Comparative Example A, versus the melt viscosities of the same PEO resin after modification, Example 32.

The melt viscosities of the PEO resins were observed to have been substantially reduced by the modification with the monomer and initiator. The melt viscosity of the unmodified and modified 200,000 g/mol PEO resins were measured at various shear rates and are presented in FIG. 7. The melt viscosity of the unmodified PEO resin, WSR N-80, was 319 Pascal*seconds (Pa*s hereinafter) at 1000 second$^{-1}$. In contrast, the melt viscosity of the same PEO resin modified by the addition of monomer and initiator, Example 32, was reduced to 74 Pa*s at the same shear rate.

The melt viscosities of Comparative Example A and Example 32 were determined by melt rheology tests performed on a Goettfert Rheograph 2003 capillary rheometer. The rheometer was operated with a 30/1 mm length/diameter die at 195° C. The apparent melt viscosities measured in Pa*s were determined at apparent shear rates of 50, 100, 200, 500, 1,000 and 2,000 second$^{-1}$ in order to develop rheology curves for each of the PEO compositions. The rheology curves of the two respective PEO compositions are presented in FIG. 7. Over the entire range of shear rates tested, the modified PEO exhibited lower apparent viscosities than the PEO from which it was modified.

The modification by grafting of the monomer onto the PEO brought about a 77 percent drop in melt viscosity. The reduced viscosity brought about by the modification of the PEO makes fiber-spinning of the PEO feasible. Fibers of very small diameters, in the range of 20–30 micrometers, were able to be continuously drawn from the above modified PEO resins. Fibers within this range of diameters are useful for making spunbond nonwoven fabrics. PEO fibers and fabrics are flushable and water-dispersible and can be used as components in flushable personal care products.

When the addition of the monomer and initiator was stopped during the extrusion process, the properties of the PEO resins reverted to their previous values and fibers could not be drawn from the unmodified PEO melt. This demonstrates that the modification does occur and improves the properties of the PEO which is critical for fiber-making and commercial viability.

Other examples of modified PEO resins were produced to further demonstrate the invention. These other examples of modified PEO resins were produced by varying: the molecular weights, 100,000 and 200,000 g/mol, and the suppliers of the PEO, Union Carbide and Planet Polymer Technology, Inc. (a compounder, hereinafter abbreviated PPT); the monomers, 2-hydroxyethyl methacrylate and the poly (ethylene glycol) ethyl ether methacrylate described above, and the amount of monomers; the amount of the LUPERSOL® 101 initiator; and the extruder. The various parameters used in the various Examples are listed in Table 7 below. The weight percentages of the components used in the Examples were calculated relative to the weight of the base resin, PEO, unless otherwise indicated.

TABLE 7

Components and Process Conditions of the Examples

| Example Number | Resin | Resin Rate (lb/hr) | Monomer | Monomer Rate (lb/hr) | Initiator | Initiator Rate (lb/hr) | Reaction Vessel |
|---|---|---|---|---|---|---|---|
| A | POLYOX N-80 | 5 | — | 0 | — | 0 | Haake |
| B | POLYOX N-10 | 5 | — | 0 | — | 0 | Haake |
| 31 | POLYOX N-80 | 5 | PEG-MA | 0.26 | L101 | 0.025 | Haake |
| 32 | POLYOX N-80 | 5 | PEG-MA | 0.49 | L101 | 0.026 | Haake |
| 33 | POLYOX N-10 | 5 | PEG-MA | 0.53 | L101 | 0.026 | Haake |
| 34 | POLYOX N-80 | 20 | PEG-MA | 0.30 | L101 | 0.026 | ZSK-30 |
| 35 | POLYOX N-80 | 20 | PEG-MA | 0.58 | L101 | 0.041 | ZSK-30 |
| 36 | POLYOX N-80 | 20 | HEMA | 0.29 | L101 | 0.025 | ZSK-30 |
| 37 | POLYOX N-80 | 20 | HEMA | 0.58 | L101 | 0.045 | ZSK-30 |

Examples 31, 32 and 33 were processed in the Haake extruder under similar conditions as disclosed in the above Comparative Examples. The same exact extruder design, temperatures and screw speed were used. However, Examples 31, 32 and 33 included the addition of monomer and initiator to the PEO resin in order to modify the PEO resin. The listed amounts of the monomer and the initiator were added at the feed throat of the Haake extruder contemporaneously with the PEO resin.

Examples 34, 35, 36 and 37 were modified in the ZSK-30 extruder detailed above. The fourteen heated barrels of the ZSK-30 extruder consist of seven heating zones. For the modification of Examples 34–37, the seven zones of the ZSK-30 extruder were all set at 180° C. and the screw speed was set at 300 rpm. The respective monomer, HEMA or PEG-MA as listed in Table 7, was injected into barrel #4 and the initiator was injected into barrel #5. Both the monomer and the initiator were injected via a pressurized nozzle injector at the listed rate. The order in which the PEO, monomer and initiator are added to the PEO is not critical. The initiator and monomer may be added at the same time or in reverse order. It should be noted that the order used in the Examples is preferred.

Although the invention has been demonstrated by the Examples, it is understood that the PEO, the polar vinyl monomer, the initiator and the conditions can be varied depending on the type of modified PEO composition and properties desired.

Fiber-Making Process

Attempts were made to melt process fibers from the PEO compositions of Examples 31, 32 and 33 using conventional melt processing techniques. The modified PEO compositions of Examples 31, 32 and 33 were melt processable into fibers by a research-scale spunbond process, in contrast to the unmodified PEO compositions of Comparative Examples A and B which could not be extruded into a melt with adequate melt strength and elasticity for processing into fibers. The melt processability of the modified PEO resins was demonstrated by a conventional spunbond process on an experimental spinning line comprising a single screw extruder, a melt metering pump and a spin plate. The spunbond process was used to spin the fibers but was not used to bind the fibers.

Freefall fibers and fibers drawn by hand and by a starter gun on a fiber-spinning line were produced from the modified PEO composition of Example 31. Freefall fibers and fibers drawn by a Lurgi gun and by a starter gun on a fiber-spinning line were produced from the modified PEO composition of Example 32. Freefall fibers and fibers drawn by a starter gun on a fiber-spinning line were produced from the modified PEO composition of Example 33.

Although no attempts have been made to process fibers from the modified PEO compositions of Examples 34, 35, 36 and 37, the modified PEO compositions are expected to be melt processable into fibers. The appearance of the extruded, modified PEO compositions of Examples 34, 35, 36 and 37 was similar to the appearance of Examples 31, 32 and 33, exhibiting lower viscosities and stickier material. These reduced melt viscosities make fiber-spinning of the modified PEO compositions possible and are particularly advantageous for commercial fiber-making, especially when using methods requiring melt processing.

Some of the modified PEO compositions were converted into meltblown fibers. The fibers retained the same beneficial water-solubility as unmodified PEO. This property is particularly desired for flushable applications. The fibers produced by the spunbond process were also water-soluble and, therefore, are easily flushable.

Physical Testing And Characterization Of Fibers

Tensile tests were performed on fibers produced from the modified PEO compositions of Examples 31, 32 and 33. The tests were performed using a Sintech 1/D tensile tester available from MTS Systems Corp., Machesny Park, Ill. The diameter of the fiber was measured before testing and then the fiber was tested with a grip separation of one inch and a crosshead speed of 500 mm/min. The diameters and the tensile properties of the fibers produced from the modified PEO resins of Examples 31, 32 and 33 were measured and are reported in Table 8 below. The fibers made from the 200,000 g/mol PEO were significantly more ductile than those made from the 100,000 g/mol. For fibers made from the same molecular weight PEO base resin, higher PEG-MA additional levels, for example 10 weight percent, led to significantly increased ductility of the fibers. The Lurgi gun-drawn PEO fibers at 10% PEG-MA addition had a peak stress of 7.2 MPa and 648 percent elongation-at-break.

These tensile property values are extremely favorable for PEO derived fibers considering unmodified PEO is very brittle in nature.

PEO resin. Significant reductions in molecular weights and the polydispersity indices were observed after reactive-extrusion of PEO with the monomer and the initiator com-

TABLE 8

Tensile Properties of Fibers Produced from Examples 31, 32 and 33

| Base Resin MW (g/mol) | PEG-MA Added (%) | Fiber-Drawing Process | Fiber Diameter ($\mu$m) | Peak Stress (MPa) | % Strain to Break (%) | Energy to Break (in-lb) | Tensile Modulus (MPa) |
|---|---|---|---|---|---|---|---|
| Ex. #31 200,000 | 5 | Free Fall | 104 | 11.0 | 68 | 0.0108 | 64.7 |
| Ex. #31 200,000 | 5 | Starter Gun | 65 | 9.7 | 72 | 0.0042 | 127.0 |
| Ex. #31 200,000 | 5 | Hand Drawn | 214 | 11.0 | 236 | 0.1741 | 75.8 |
| Ex. #32 200,000 | 10 | Free Fall | 104 | 9.1 | 367 | 0.0517 | 49.2 |
| Ex. #32 200,000 | 10 | Starter Gun | 102 | 8.5 | 340 | 0.0430 | 49.0 |
| Ex. #32 200,000 | 10 | Lurgi Gun | 72 | 7.2 | 648 | 0.0336 | 58.3 |
| Ex. #33 100,000 | 10 | Free Fail | 103 | 2.2 | 10 | 0.0003 | 252.4 |
| Ex. #33 100,000 | 10 | Starter Gun | 67 | 4.1 | 7.8 | 0.0001 | 232.8 |

GPC Analysis

The number-average molecular weight ($M_n$), the weight-average molecular weight ($M_w$), and the z-average molecular weight ($M_z$) of Comparative Examples A and B and Examples 31, 32 and 33 were determined by gel permeation chromatography. The GPC analysis was conducted by American Polymer Standards Corporation of Mentor, Ohio. From these measurements the polydispersity indices ($M_w/M_n$) of the respective examples were calculated. The various molecular weights and the polydispersity of the examples are reported in Table 9 below.

NMR Analysis

Figure 8:
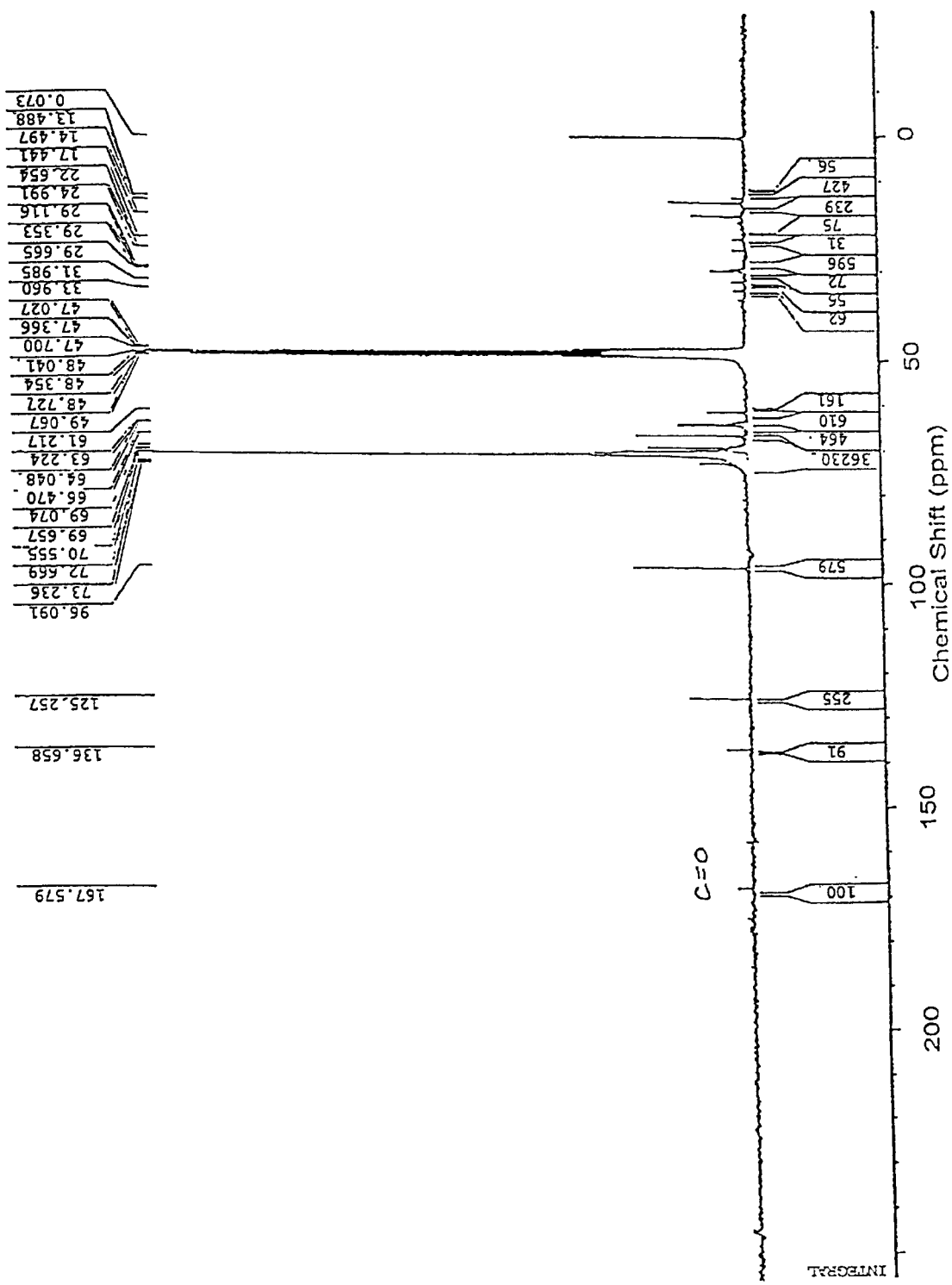
FIG. 8 is a $^{13}$C-Nuclear Magnetic Resonance spectra of the modified PEO of Example 32.
Figure 9:
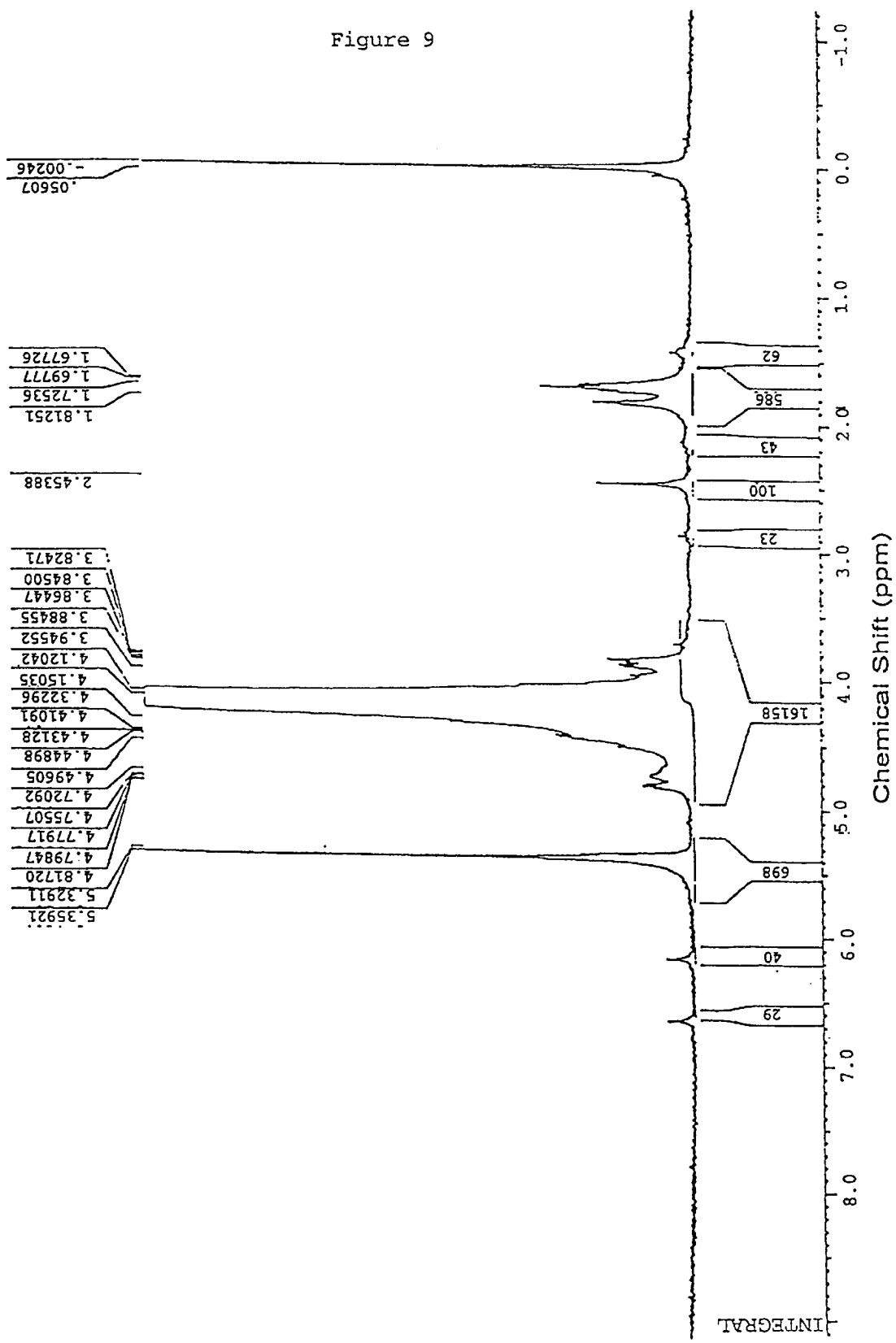
FIG. 9 is a $^1$H-Nuclear Magnetic Resonance spectra of the modified PEO of Example 32.

The modified PEO composition of the Examples 31, 32 and 33 were analyzed NMR spectroscopy. The $^{13}$C and $^1$H NMR spectra of Example 32 are presented as FIGS. 8 and 9, respectively. The results of this analyses confirmed that modified PEO contained PEG-MA units.

The grafting levels of the modified PEO compositions of Examples 31, 32 and 33 as measured by NMR analysis are reported as weight percentages of monomer per weight of PEO base resin that grafted to the PEO resin and are reported in Table 9. The percentages of ungrafted monomer of Examples 31, 32 and 33 are likewise reported in Table 9.

TABLE 9

Chemical Properties of Comparative Examples A and B and the Modified PEO Compositions of Examples 31, 32 and 33

| Example No. | A | B | 31 | 32 | 33 |
|---|---|---|---|---|---|
| $M_n$ | 12,650 | 11,050 | 11,400 | 11,450 | 9,450 |
| $M_w$ | 148,100 | 115,900 | 97,200 | 109,300 | 90,600 |
| $M_z$ | 840,500 | 698,400 | 515,700 | 541,300 | 601,500 |
| $M_w/M_n$ | 11.71 | 10.49 | 8.53 | 9.53 | 9.59 |
| % PEG-MA grafting level | 0 | 0 | 4.51 | 5.08 | 5.49 |
| % residual ungrafted PEG-MA | 0 | 0 | 0.43 | 3.41 | 4.43 |

The molecular weights of the modified PEO Examples are significantly different versus the corresponding unmodified PEO resin. Significant reductions in molecular weights and the polydispersity indices were observed after reactive-extrusion of PEO with the monomer and the initiator compared to the unmodified, extruded PEO of the Comparative Examples. The weight-average molecular weight of the N-80 PEO dropped from 148,100 g/mol for the unmodified, but similarly processed, N-80 PEO of Comparative Example A to 97,200 g/mol for the 5% grafted N-80 PEO of Example 31 and to 109,300 g/mol for the 10% grafted N-80 PEO of Example 32. Similarly, the weight-average molecular weight of the N-10 PEO dropped from 115,900 g/mol for the unmodified N-10 PEO of Comparative Example B to 90,600 g/mol for the 10% grafted PEO N-10 of Example 33. Thus, the modification of the PEO resins produced a significant reduction in weight-average molecular weight. However, the number-average molecular weight was not as greatly affected by the modification, thereby, producing a significant decrease in the polydispersity index and, hence, a narrower molecular weight distribution.

The fundamental changes in modified PEO brought about by the chemical grafting have profound and unexpected effects on the physical properties and melt processability of PEO as demonstrated herein and discussed above. The narrower molecular weight distributions of the modified PEO compositions result in improved melt and solid state properties. Although not wishing to be bound by the following theory, it is believed that during the reactive-extrusion processing of PEO resins, the initiator initiated three competing reactions: 1) grafting of vinyl monomer onto the PEO, 2) degradation of the PEO, and 3) crosslinking of the PEO. A novel method of achieving improved properties has been developed that is contrary to traditional methodology and thinking in polymer development. The method degrades the polymer into shorter chains as opposed to only increasing the molecular weight by grafting and crosslinking. The resulting modified PEO compositions have improved melt strength and melt elasticity, overcoming the inherent deficiencies of both low molecular weight PEO and high molecular weight PEO.

In the case of grafting, the presence of a sufficient amount of monomer(s) as demonstrated in the Examples herein, cross-linking is negligible and does not adversely affect the properties of the modified PEO. The crosslinking reaction only predominates when there is little or no monomer present during the modification of the PEO resin. Therefore, the grafting and the degradation reactions of the PEO should predominate and are desired to produce PEO compositions suitable for film and fiber making purposes.

The modified PEO resins are observed to have improved melt strengths and melt elasticities, overcoming the inherent deficiencies of both low molecular weight and high molecular weight PEO. These improved melt properties allow the modified PEO to be processed into useful fibers with diameters of less than 100 micrometers using conventional fiber drawing techniques. These same improved melt properties also allow the modified PEO resins to be processed into useful films with thicknesses of less than 0.5 mil and with improved and balanced solid state properties.

The present invention has been illustrated in great detail by the above specific Examples. It is to be understood that these Examples are illustrative embodiments and that this invention is not to be limited by any of the Examples or details in the Description. Those skilled in the art will recognize that the present invention is capable of many modifications and variations without departing from the scope of the invention. Accordingly, the Detailed Description and Examples are meant to be illustrative and are not meant to limit in any manner the scope of the invention as set forth in the following claims. Rather, the claims appended hereto are to be construed broadly within the scope and spirit of the invention.

What is claimed is:

1. An extrusion method for modifying poly(ethylene oxide) comprising:
   adding a poly(ethylene oxide), an initiator and a polar vinyl monomer into an extruder; and
   mixing the poly(ethylene oxide), the initiator and the polar vinyl monomer under conditions sufficient to graft the polar vinyl monomer onto the PEO.

2. The method of claim 1, wherein the initiator is free radical initiator.

3. The method of claim 1, wherein the polar vinyl monomer is selected from the group consisting of poly(ethylene glycol) methacrylates and 2-hydroxyethyl methacrylate.

4. The method of claim 3, wherein the polar vinyl monomer is a poly(ethylene glycol) methacrylate.

5. The method of claim 4, wherein the poly(ethylene glycol) methacrylate is poly(ethylene glycol) ethyl ether methacrylate and has a number average molecular weight of not greater than about 5,000 grams per mol.

6. The method of claim 2, wherein the polar vinyl monomer is 2-hydroxyethyl methacrylate.

7. The method of claim 1, wherein the method is a non-aqueous method and the poly(ethylene oxide) has an initial approximate molecular weight greater than about 300,000 grams per mol.

8. The method of claim 1, wherein the conditions sufficient to graft the polar vinyl monomer onto the poly(ethylene oxide) comprises heating the poly(ethylene oxide), the polar vinyl monomer and the initiator.

9. The method of claim 8, wherein the conditions sufficient to graft the polar vinyl monomer onto the poly(ethylene oxide) comprise heating the poly(ethylene oxide), the polar vinyl monomer and the free radical initiator to a temperature within the range of the melting point of the poly(ethylene oxide) to the decomposition temperature of the poly(ethylene oxide).

10. The method of claim 9, wherein the appropriate conditions to graft the polar vinyl monomer onto the poly(ethylene oxide) comprise heating the poly(ethylene oxide), the polar vinyl monomer and the free radical initiator to a temperature within the range of about 120° C. to about 220° C.

11. The method of claim 1, wherein the poly(ethylene oxide) has an initial approximate molecular weight ranging from about 50,000 grams per mol to about 8,000,000 grams per mol.

12. The method of claim 11, wherein the poly(ethylene oxide) has an initial approximate molecular weight ranging from about 300,000 grams per mol to about 8,000,000 grams per mol.

13. The method of claim 1, wherein the poly(ethylene oxide) has an initial approximate molecular weight ranging from about 50,000 grams per mol to about 400,000 grams per mol.

14. The method of claim 13, wherein the poly(ethylene oxide) has an initial approximate molecular weight ranging from about 50,000 grams per mol to about 200,000 grams per mol.

15. The method of claim 1, wherein the polar vinyl monomer is added within the range of about 0.1 to about 20 weight percent relative to the weight of the poly(ethylene oxide).

16. The method of claim 1, wherein the polar vinyl monomer is added within the range of about 0.5 to about 10 weight percent relative to the weight of the poly(ethylene oxide).

17. The method of claim 1, wherein the initiator is added within the range of about 0.05 to about 0.35 weight percent relative to the weight of the poly(ethylene oxide).

18. The method of claim 17, wherein the initiator is added within the range of about 0.10 to about 0.35 weight percent relative to the weight of the poly(ethylene oxide).

19. The method of claim 18, wherein the initiator is added within the range of about 0.15 to about 0.25 weight percent relative to the weight of the poly(ethylene oxide).

20. A method for grafting a polar vinyl monomer onto a poly(ethylene oxide) comprising:
   adding to a reaction vessel a poly(ethylene oxide), from about 0.1 weight percent to about 20 weight percent relative to the weight of the poly(ethylene oxide) of a polar vinyl monomer selected from the group of poly(ethylene glycol) methacrylate and 2-hydroxyethyl methacrylate, and a free radical initiator;
   mixing the poly(ethylene oxide), the polar vinyl monomer and the free radical initiator; and
   heating the mixture to above the melting point of the poly(ethylene oxide) to form a crafted poly(ethylene oxide).

21. A method of reactive-extrusion comprising:
   adding a poly(ethylene oxide), a polar vinyl monomer selected from the group of poly(ethylene glycol) methacrylate and 2-hydroxyethyl methacrylate, and a free radical initiator into an extruder; and
   mixing and heating the poly(ethylene oxide), the polar vinyl monomer and the free radical initiator while extruding in order to graft the polar vinyl monomer onto the poly(ethylene oxide).

* * * * *